(12) United States Patent
Conway et al.

(10) Patent No.: US 6,713,711 B2
(45) Date of Patent: Mar. 30, 2004

(54) PLASMA ARC TORCH QUICK DISCONNECT

(75) Inventors: Christopher J. Conway, Wilmot, NH (US); Fred Rogers, Enfield Center, NH (US); Darrin H. MacKenzie, Windsor, VT (US); Douglass A. Demers, Grantham, NH (US); Stewart Trent Adams, Plainfield, NH (US); Joseph P. Jones, Lebanon, NH (US)

(73) Assignee: Thermal Dynamics Corporation, West Labanon, NH (US)

( * ) Notice: Subject to any disclaimer, the term of this patent is extended or adjusted under 35 U.S.C. 154(b) by 179 days.

(21) Appl. No.: 10/052,364

(22) Filed: Nov. 9, 2001

(65) Prior Publication Data

US 2003/0100208 A1 May 29, 2003

(51) Int. Cl.7 .................................................. B23K 9/00
(52) U.S. Cl. ........................... 219/121.48; 219/121.54; 219/121.51; 219/121.59; 219/137.63
(58) Field of Search ....................... 219/121.39, 121.36, 219/121.52, 121.51, 121.54, 121.5, 121.45, 74, 75, 121.48, 121.49, 137.63

(56) References Cited

U.S. PATENT DOCUMENTS

| | | |
|---|---|---|
| 1,978,076 A | 10/1934 | Cassedy, Jr. |
| 2,264,687 A | 12/1941 | Winkler et al. |
| 3,008,116 A | 11/1961 | Blanchenot |
| 3,165,340 A | 1/1965 | Kuehl et al. |
| 3,235,682 A | 2/1966 | Papworth |
| 3,283,214 A | 11/1966 | Ortwig et al. |
| 3,328,743 A | 6/1967 | Acord |
| 3,432,795 A | 3/1969 | Jayne |
| 3,478,302 A | 11/1969 | Chirumbolo |
| 3,569,908 A | 3/1971 | Appleton |
| 3,571,784 A | 3/1971 | Naus |
| 3,648,213 A | 3/1972 | Kobler |
| 3,675,804 A | 7/1972 | Micalief |
| 3,711,815 A | 1/1973 | Pierce et al. |
| 3,822,027 A | 7/1974 | Cherba |
| 3,838,382 A | 9/1974 | Sugar |
| 3,901,574 A | 8/1975 | Paullus et al. |
| 3,945,703 A | 3/1976 | McCormick |
| 3,980,373 A | 9/1976 | McCormick et al. |
| 3,986,765 A | 10/1976 | Shaffer et al. |

(List continued on next page.)

Primary Examiner—Mark Paschall
(74) Attorney, Agent, or Firm—Harness, Dickey & Pierce, P.L.C.

(57) ABSTRACT

A quick disconnect for use in a plasma arc torch is provided that comprises a plug housing and a mating socket housing, a locking ring disposed around the plug housing secures the plug housing to the socket housing. A negative lead gas carrying pin is disposed within the plug housing, and a mating main power socket is disposed within the socket housing for the purpose of conducting both gas and electricity from a power supply to a plasma arc torch. Further, the negative lead gas carrying pin and mating main power socket are positioned off-center in order to provide additional volume for a plurality of signal conductors disposed within each housing, along with a pilot return conductor. Additionally, both the plug housing and the socket housing define a D-configuration in order to properly align the housings and conductors disposed therein, among other novel features of the present invention.

44 Claims, 26 Drawing Sheets

U.S. PATENT DOCUMENTS

| | | | |
|---|---|---|---|
| 4,013,331 | A | 3/1977 | Kobler |
| 4,019,799 | A | 4/1977 | Bouvier |
| 4,034,172 | A | 7/1977 | Glover et al. |
| 4,044,208 | A | 8/1977 | McDonald et al. |
| 4,059,332 | A | 11/1977 | Phillips et al. |
| 4,082,398 | A | 4/1978 | Bourdon et al. |
| 4,090,629 | A | 5/1978 | Hedgewick |
| 4,140,358 | A | 2/1979 | Marechal |
| 4,166,664 | A | 9/1979 | Herrmann, Jr. |
| 4,221,446 | A | 9/1980 | Niles et al. |
| 4,277,125 | A | 7/1981 | Ball |
| 4,358,179 | A | 11/1982 | Bourdon et al. |
| 4,374,604 | A | 2/1983 | Hemmer et al. |
| 4,415,213 | A | 11/1983 | Punako et al. |
| 4,421,378 | A | 12/1983 | Sanford et al. |
| 4,443,052 | A | 4/1984 | Eaby et al. |
| 4,468,078 | A | 8/1984 | Frear et al. |
| 4,628,392 | A | 12/1986 | Didier |
| 4,636,020 | A | 1/1987 | Marmillion |
| 4,639,061 | A | 1/1987 | Muzslay |
| 4,660,803 | A | 4/1987 | Johnston et al. |
| 4,676,572 | A | 6/1987 | Booker |
| 4,737,119 | A | 4/1988 | Stieler |
| 4,749,373 | A | 6/1988 | Brekosky et al. |
| 4,752,251 | A | 6/1988 | Kato et al. |
| 4,753,458 | A | 6/1988 | Case et al. |
| 4,927,382 | A | 5/1990 | Huber |
| 5,074,802 | A | 12/1991 | Gratziani et al. |
| 5,161,834 | A | 11/1992 | Norkey |
| 5,174,787 | A | 12/1992 | Shirai et al. |
| 5,211,582 | A | 5/1993 | Morse et al. |
| 5,346,406 | A | 9/1994 | Hoffman et al. |
| 5,372,517 | A | 12/1994 | Levesque |
| 5,378,870 | A * | 1/1995 | Krupnicki ............... 219/121.39 |
| 5,458,501 | A | 10/1995 | Lazaro, Jr. et al. |
| 5,471,740 | A | 12/1995 | Morse et al. |
| 5,551,147 | A | 9/1996 | Morse et al. |
| 5,591,049 | A | 1/1997 | Dohnishi |
| 5,655,916 | A | 8/1997 | Hayashi |
| 5,662,488 | A | 9/1997 | Alden |
| 5,738,143 | A | 4/1998 | Faughn |
| 5,906,402 | A | 5/1999 | Simmons et al. |
| 5,913,703 | A | 6/1999 | Suzuki et al. |
| 5,988,705 | A | 11/1999 | Norkey |
| 6,472,631 | B1 * | 10/2002 | Eickhoff et al. ........ 219/121.39 |

* cited by examiner

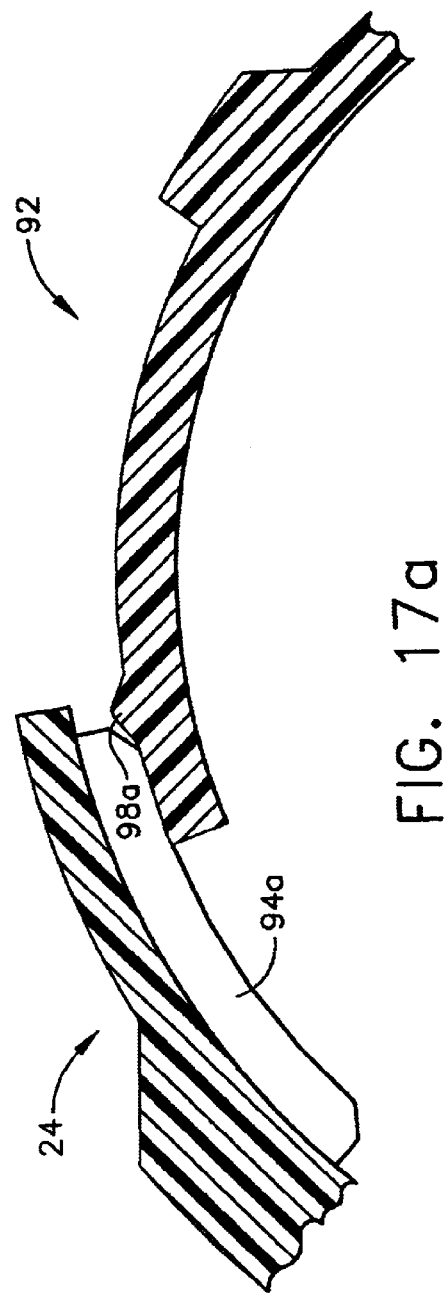

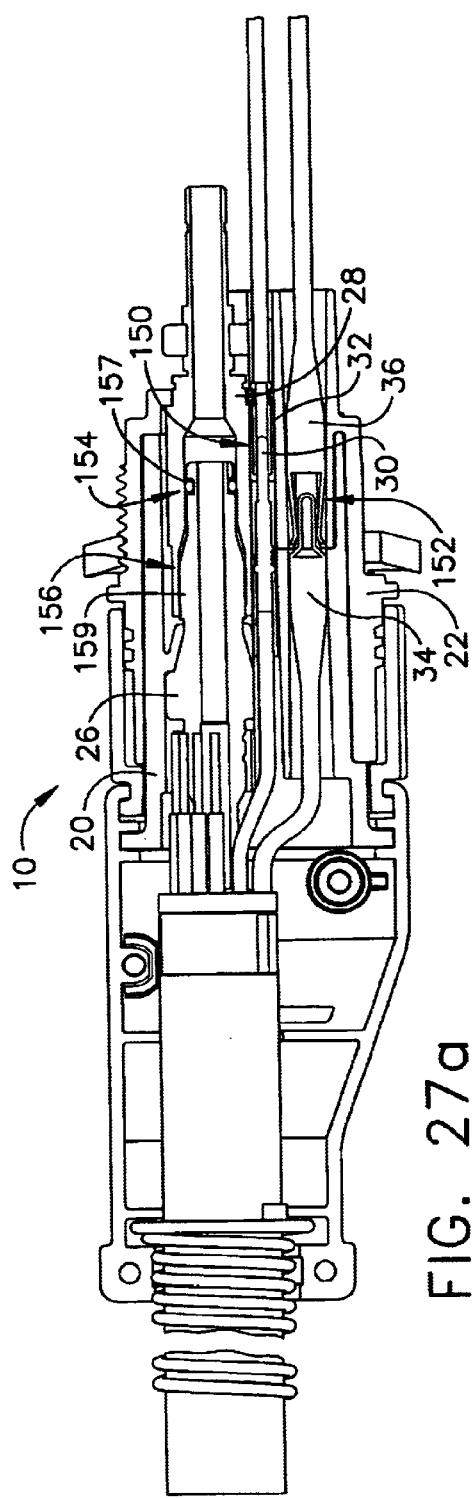
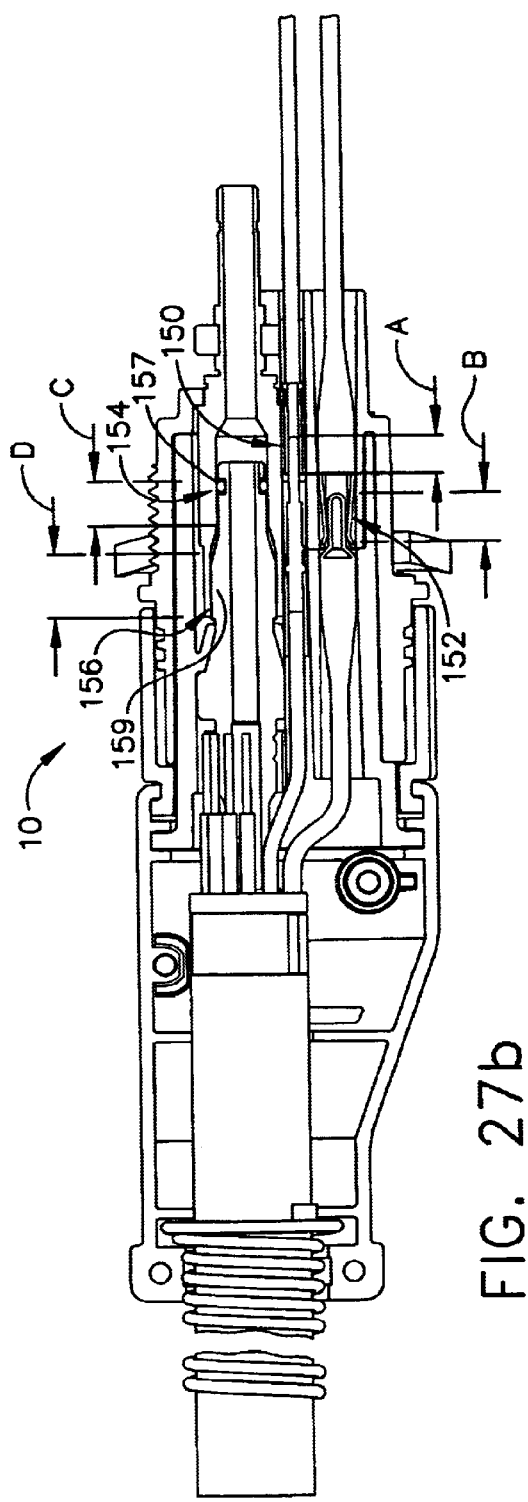
FIG. 27a
FIG. 27b

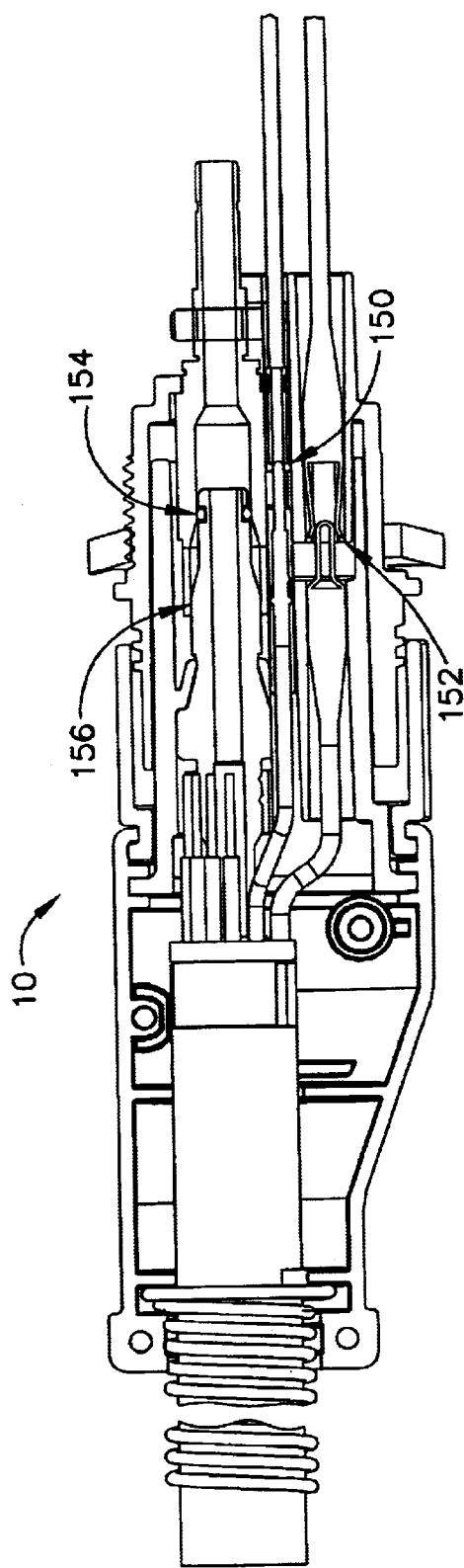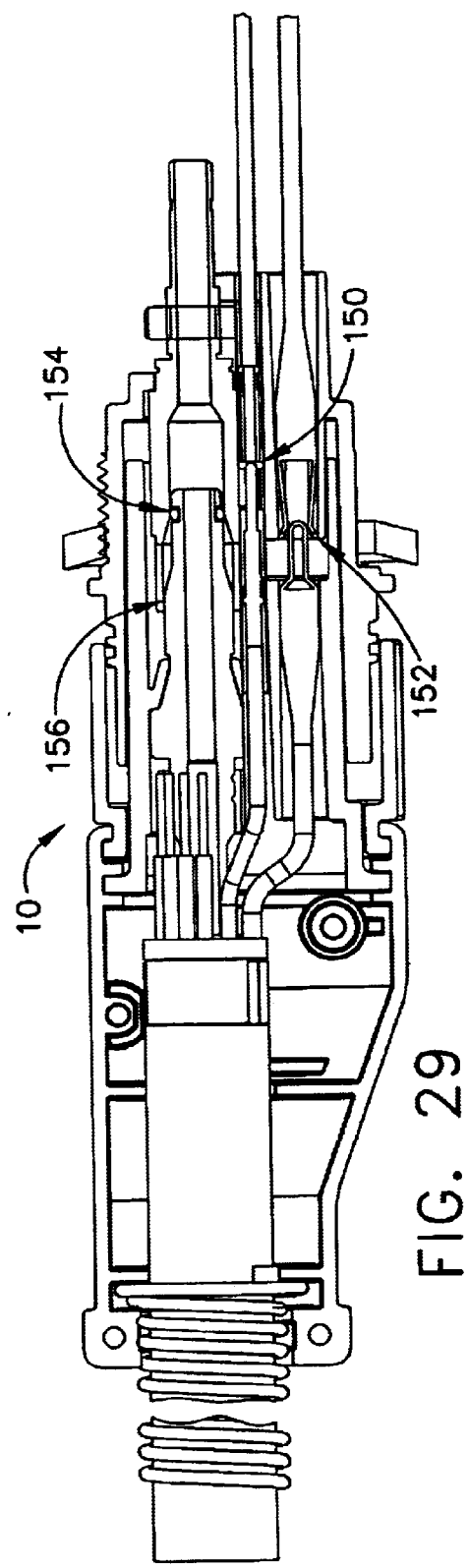
FIG. 28
FIG. 29

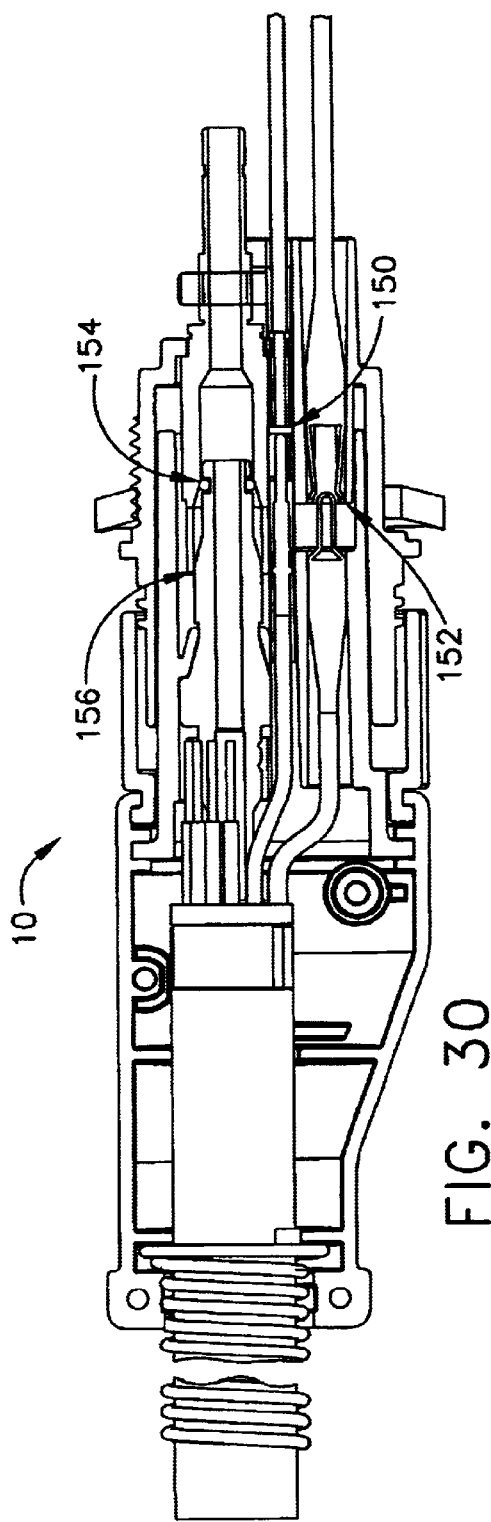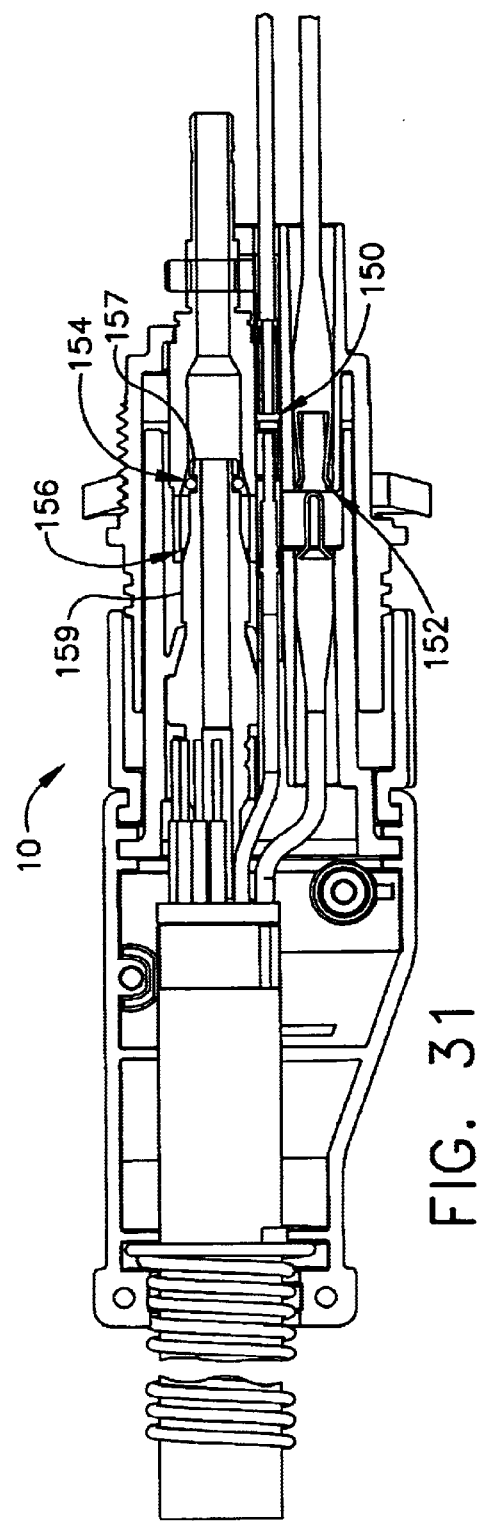

PLASMA ARC TORCH QUICK DISCONNECT

FIELD OF THE INVENTION

The present invention relates generally to quick disconnects and more particularly to quick disconnects for use between a power supply and a torch lead in a plasma arc torch through which both fluid (e.g. gas, liquid) and electrical power are conducted.

BACKGROUND OF THE INVENTION

In manually operated plasma arc torches of the known art, a torch is commonly connected to a power supply through a torch lead, which is typically available in a variety of lengths according to requirements of a specific application. Additionally, the torch lead is often secured to the power supply using a quick disconnect such that the torch lead may be quickly and easily removed from the power supply in the event that the torch and/or torch lead is damaged or requires replacement. Further, the quick disconnect allows a torch and torch lead to be easily interchanged with a variety of power supplies if necessary.

Typically, the torch lead side of the quick disconnect comprises a housing, commonly in the form of a plug, with a variety of electrical and fluid, (e.g., gas, liquid), conductors disposed therein. Similarly, the power supply side of the quick disconnect also comprises a housing, commonly in the form of a socket, adapted to receive the plug, with a mating set of electrical and gas conductors disposed therein. Generally, the mating conductors comprise one or more main power pins and mating sockets that conduct both electric power and fluid for operation of the torch, wherein high current, high voltage, and/or high frequency electrical power is provided to initiate and operate a plasma arc. Further, a plurality of signal pins and mating signal sockets conduct electrical signals for operation of the torch such as a trigger switch or electrical grounding, among others. Moreover, some or all of the mating conductors, including the main power pins and sockets, may be replaceable such that an inoperative or broken conductor may be replaced in the field as necessary.

The majority of quick disconnects that connect a plasma arc torch lead to a power supply comprise a threaded connection between the torch lead side of the connection and the power supply side of the connection. Typically, a locking ring is disposed around one housing or the other, and after the individual conductors and the housings are engaged, internal threads of the locking ring engage external threads of one of the housings, typically the socket housing, to secure the connection therebetween. Unfortunately, the quick disconnects of the known art comprise a relatively fine pitch thread that requires several turns of the locking ring in order to fully engage the quick disconnect. Additionally, no indication of a fully mated condition of the quick disconnect is provided in connectors of the known art. Rather, a user tightens the locking ring until the locking ring cannot be turned any further. Moreover, it is often difficult to properly engage the threads to initiate a connection since the threads must generally be aligned, in addition to aligning the conductors within the housings, which often causes a significant amount of rotation of the locking ring to initiate threaded contact. Engagement is particularly difficult and time consuming when the threads of the locking ring and the housing comprise a finer pitch. To simplify threaded contact, known art connectors have employed coarser threads in order to facilitate ease of connection. However, a finer pitch generally results in a more robust and reliable connection and thus the coarser threads reduce the robustness and reliability of the connection. Accordingly, a trade-off exists between ease of connection and a robust and reliable connection in threaded connectors of the known art.

Therefore, quick disconnects for plasma arc torches of the known art are typically heavy and bulky in order to accommodate the multitude of electrical and gas conductors disposed therein. As a result, connecting and disconnecting a torch lead to and from a power supply is often cumbersome and difficult in the field. Further, proper alignment of the individual fluid and electrical conductors disposed within each side of the quick disconnect becomes more difficult with the heavy and bulky quick disconnects. Moreover, the use of a threaded connection between the housings, especially when the threads comprise a finer pitch, results in an even more difficult quick disconnect to engage and disengage.

Additionally, the conductors of known art quick disconnects are often prone to damage when the quick disconnect is disengaged since the conductors often extend or protrude beyond the ends of their respective housings. Further, when a conductor is damaged or broken in the field, an improper conductor may inadvertently be used to replace the damaged conductor such that unsuitable equipment, e.g. torches, are mistakenly connected to the power supply. As a result, the torch may function improperly or parts may wear prematurely. In addition, the torch can be damaged or operate improperly when disengaging quick disconnects of the known art as all of the connections are typically broken simultaneously, or in some instances, the gas continues to flow even when the quick disconnect is not fully engaged. Consequently, the plasma arc torch may become damaged or difficult to operate should an inadvertent disengagement of the quick disconnect occur during operation of the torch.

Accordingly, a need remains in the art for a quick disconnect for use between a power supply and a plasma arc torch that is relatively compact and easy to engage, and which further provides a positive indication of a fully mated condition. A further need exists for a quick disconnect that reduces the risk of damage to the conductors disposed therein and that reduces the risk of replacing a damaged conductor with an improper conductor, thereby improving the performance of a plasma arc torch. Moreover, a need exists for a quick disconnect that reduces the risk of arcing and that prevents damage to the plasma arc apparatus when a quick disconnect is not fully engaged.

SUMMARY OF THE INVENTION

In one preferred form, the present invention provides a quick disconnect for use between a power supply and a torch lead in a plasma arc apparatus such as a plasma arc cutting torch, hereinafter referred to as a plasma arc torch. Generally, the quick disconnect provides a connection for both fluid, (e.g., gas, liquid), flow and electrical power between the power supply and the torch, while providing a connection that may be quickly engaged and disengaged in the field. Further, as used herein, a plasma arc apparatus, whether manual or automated, shall be construed by those skilled in the art to be an apparatus that generates or uses plasma for cutting, welding, spraying, or marking operations, among others. Accordingly, the specific reference to plasma arc cutting torches or plasma arc torches herein should not be construed as limiting the scope of the present invention.

According to one form of the present invention, the quick disconnect comprises a plug housing secured to a torch lead that engages a socket housing secured to a power supply, wherein a locking ring disposed around the plug housing engages the socket housing to secure the plug housing to the socket housing. Alternately, the plug housing may be secured to the power supply, and the socket housing may be secured to the torch lead. Further, a plurality of both fluid and electric conductors are disposed within the plug and socket housings, which include but are not limited to, a negative lead gas carrying pin secured within the plug housing, or alternately the socket housing, that engages a main power socket secured within the socket housing, or alternately the plug housing. In addition, a plurality of signal pins are disposed within the plug housing, or alternately the socket housing, that engage a plurality of signal sockets disposed within the socket housing, or alternately the plug housing. Moreover, a pilot return pin is disposed within the plug housing, or alternately the socket housing, that engages a pilot return socket disposed within the socket housing, or alternately the plug housing. Additionally, the negative lead gas carrying pin and the main power socket are positioned off-center in order to provide additional volume for the signal pins and the pilot return pin, thereby resulting in a relatively compact quick disconnect.

Preferably, the plug and socket housings further define a D-configuration to align the housings and their respective conductors for proper engagement. Further, the quick disconnect comprises a signal pin shroud at a distal end of at least one of the plug or socket housing that separates the conductors to provide a dielectric barrier therebetween. Moreover, the main power socket preferably comprises a plurality of fingers to engage the negative lead gas carrying pin, which are separated by axial slots having a certain length. Additionally, the main power socket defines an undercut at a proximal end thereof, wherein a plurality of radial contact pads engage the negative lead gas carrying pin. Accordingly, the required length of the axial slots is reduced with the undercut and the radial contact pads, thereby resulting in a shorter main power socket and a more compact quick disconnect. Furthermore, more than one negative lead gas carrying pin, or main pin that conducts either or both electrical power and fluid, may be disposed within the plug housing, with a corresponding plurality of main power sockets disposed within the socket housing for operation of a plasma arc torch with more than one fluid, (e.g. gas, liquid), supply.

In another preferred form, a connector is provided that comprises a socket housing defining a D-configuration and a plug housing having a corresponding D-configuration, which shape forces a particular orientation of the plug housing within the socket housing. Further, a locking ring disposed around the plug housing engages the socket housing to secure the plug housing to the socket housing. Additionally, a plurality of fluid and electrical conductors are disposed within the housings such that the connector provides a connection for both fluid and electric power in a single connector.

In yet another preferred form, a plug housing is provided for use in a quick disconnect for a plasma arc torch that comprises a hollow internal channel positioned off-center the plug housing in order to provide additional volume for further conductors disposed therein. Further, the plug housing defines a D-configuration to align the plug housing with a mating socket housing. Moreover, the plug housing comprises a plurality of signal pin channels and a pilot return channel for disposition of additional electrical conductors for operation of the plasma arc torch.

In another preferred form, a socket housing is provided for use in a quick disconnect for a plasma arc torch that comprises a main power socket aperture positioned off-center the socket housing in order to provide additional volume for further conductors disposed therein. Additionally, the socket housing defines a D-configuration to align the socket housing with a mating plug housing. Moreover, the socket housing comprises a plurality of signal pin apertures and a pilot return aperture for disposition of additional electrical conductors for operation of the plasma arc torch.

In yet another preferred form, a connector is provided that generally comprises a housing defining a first threaded portion and a second threaded portion, wherein the first threaded portion comprises a pitch that is coarser than a pitch of the second threaded portion. A locking ring is also provided that defines a thread engagement member that engages the first threaded portion and the second threaded portion to secure the locking ring to the housing with a varying amount of axial travel per rotation of the locking ring that corresponds with the pitch of the first threaded portion and the second threaded portion. Accordingly, the connector is relatively simple to engage as the thread engagement member engages the coarser threads of the first threaded portion. Furthermore, a robust and reliable connection is provided as the thread engagement member engages the finer threads of the second threaded portion as the locking ring is further rotated.

Additionally, the thread engagement member preferably comprises two diametrically opposed radial protrusions that engage the first threaded portion and the second threaded portion as the locking ring is rotated. Further, the housing preferably comprises thread protrusions disposed within the second threaded portion such that the radial protrusions on the locking ring engage the thread protrusions on the housing to provide an audible and/or tactile indication of a fully mated condition between the locking ring and the housing. Additionally, a lateral stop is disposed at an end of the second threaded portion to limit travel of the locking ring.

In another form, a connector is provided that comprises a housing defining a hollow internal channel, wherein a plurality of locking fingers are disposed that engage a pin to secure the pin within the housing. Accordingly, the pin defines a first collar with a shoulder disposed thereon such that the locking fingers engage the shoulder to secure the pin within the housing. Additionally, the hollow internal channel further comprises a first portion and the pin further defines a second collar such that the second collar blocks access to the locking fingers through the first portion. As a result, the locking fingers cannot be accessed to disengage the pin as the second collar engages the first portion of the hollow internal channel. Furthermore, the pin is recessed within a second portion of the hollow internal channel when the locking fingers fully engage the shoulder, thereby restricting access to the pin such that the connection remains tamper resistant.

In yet another form, a pin for use in a quick disconnect of a plasma arc torch is provided that generally comprises an o-ring groove disposed around a cylindrical portion of the pin. Further, an o-ring removal slot is provided in the pin that adjoins the o-ring groove, such that the o-ring removal slot provides access for removal of an o-ring disposed within the o-ring groove. In one form, the o-ring groove is recessed within a housing of the quick disconnect to protect the pin during use. Therefore, the o-ring, which provides a fluid-tight seal between the pin and a mating socket, is difficult to remove for inspection and/or replacement. Accordingly, the o-ring removal slot provides the requisite access to remove the o-ring from the recessed o-ring groove, using, for example, an o-ring removal tool.

In another form, a quick disconnect for use in a plasma arc torch is provided, wherein specific conductors disposed within the quick disconnect are configured to disengage in a specific sequence in order to improve the performance of the plasma arc torch. Generally, upon disengagement of the quick disconnect, signal connections break before a pilot return connection, a fluid connection, and a main power connection. Further, the pilot return connection breaks before the fluid connection and the main power connection, and the fluid connection breaks before the main power connection. Accordingly, a make-break timing sequence is provided through establishing specific connection configurations and specific lengths of connections throughout the quick disconnect.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 16 is a partial cross-sectional view, taken along line C—C of FIG. 15, of an embodiment of a thread protrusion constructed in accordance with the principles of the present invention;

FIG. 17a is a partial cross-sectional view of an embodiment of a radial protrusion engaging a thread protrusion and constructed in accordance with the principles of the present invention;

FIG. 27a is a cross-sectional view of an embodiment of a quick disconnect fully mated and constructed in accordance with the principles of the present invention;

FIG. 27b is a cross-sectional view of an embodiment of a quick disconnect fully mated, illustrating the lengths of the connections, in accordance with the principles of the present invention;

FIG. 28 is a cross-sectional view of an embodiment of a quick disconnect wherein a signal connection is broken before a pilot return connection, a fluid connection, and a main power connection in accordance with the principles of the present invention;

FIG. 29 is a cross-sectional view of an embodiment of a quick disconnect wherein a pilot return connection is broken after a signal connection in accordance with the principles of the present invention;

FIG. 30 is a cross-sectional view of an embodiment of a quick disconnect wherein a fluid connection is broken after a pilot return connection in accordance with the principles of the present invention;

FIG. 31 is a cross-sectional view of an embodiment of a quick disconnect wherein a main power connection is broken after a signal connection, a pilot return connection, and a fluid connection in accordance with the principles of the present invention.

DETAILED DESCRIPTION OF THE PREFERRED EMBODIMENTS

The following description of the preferred embodiments is merely exemplary in nature and is in no way intended to limit the invention, its application, or uses.

Figure 1:
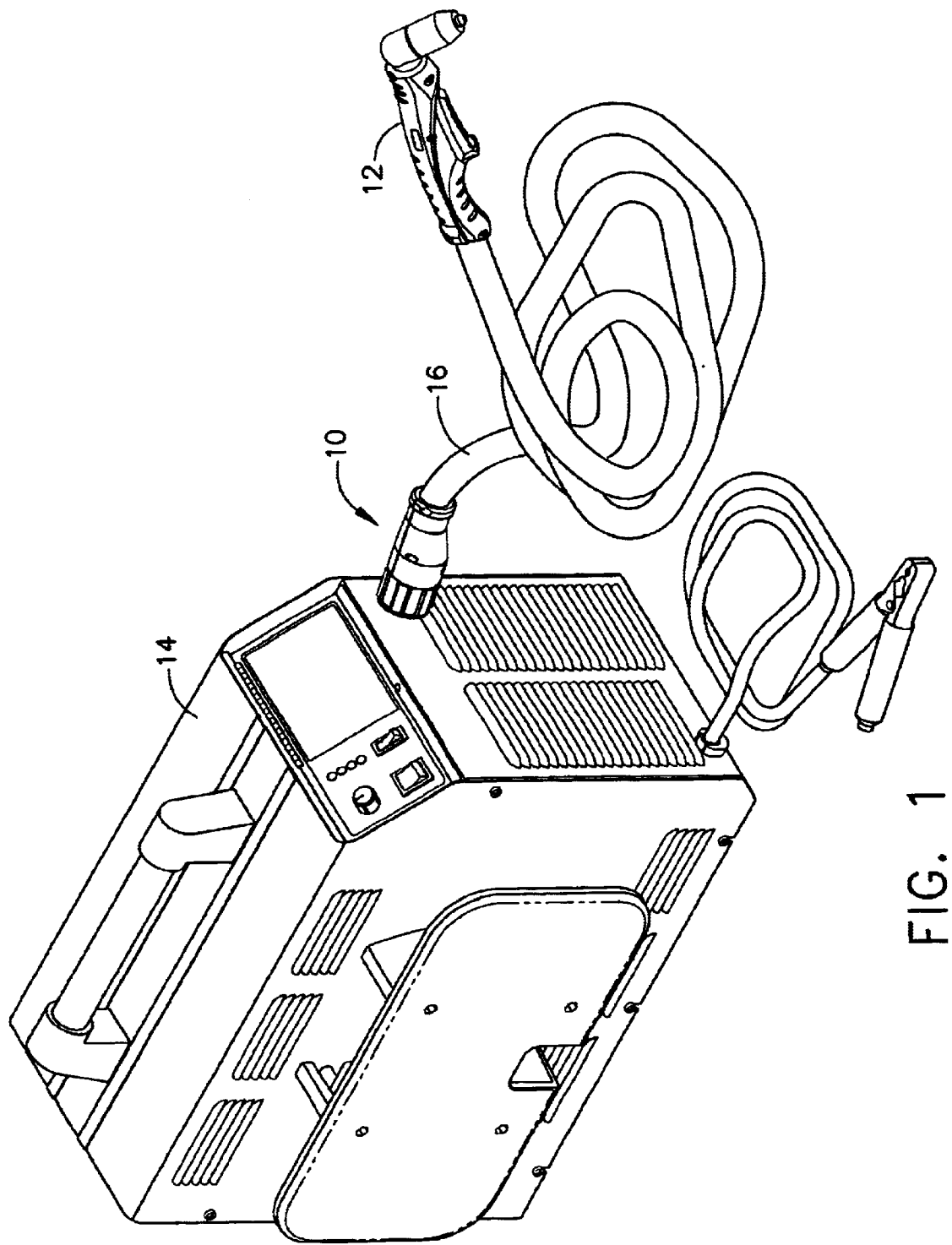
FIG. 1 is a perspective view of an embodiment of a quick disconnect between a power supply and a torch lead constructed in accordance with the principles of the present invention.

Referring to the drawings, a quick disconnect according to the present invention is illustrated and generally indicated by reference numeral 10 in FIG. 1. Typically, a manually operated plasma arc torch comprises a torch 12 connected to a power supply 14 through a torch lead 16, which may be available in a variety of lengths according to a specific application. As shown, the quick disconnect 10 provides a quick and convenient connection between the torch lead 16 and the power supply 14 in the event that either the power supply 14 or the torch 12 and torch lead 16 require replacement in the field.

Figure 2:
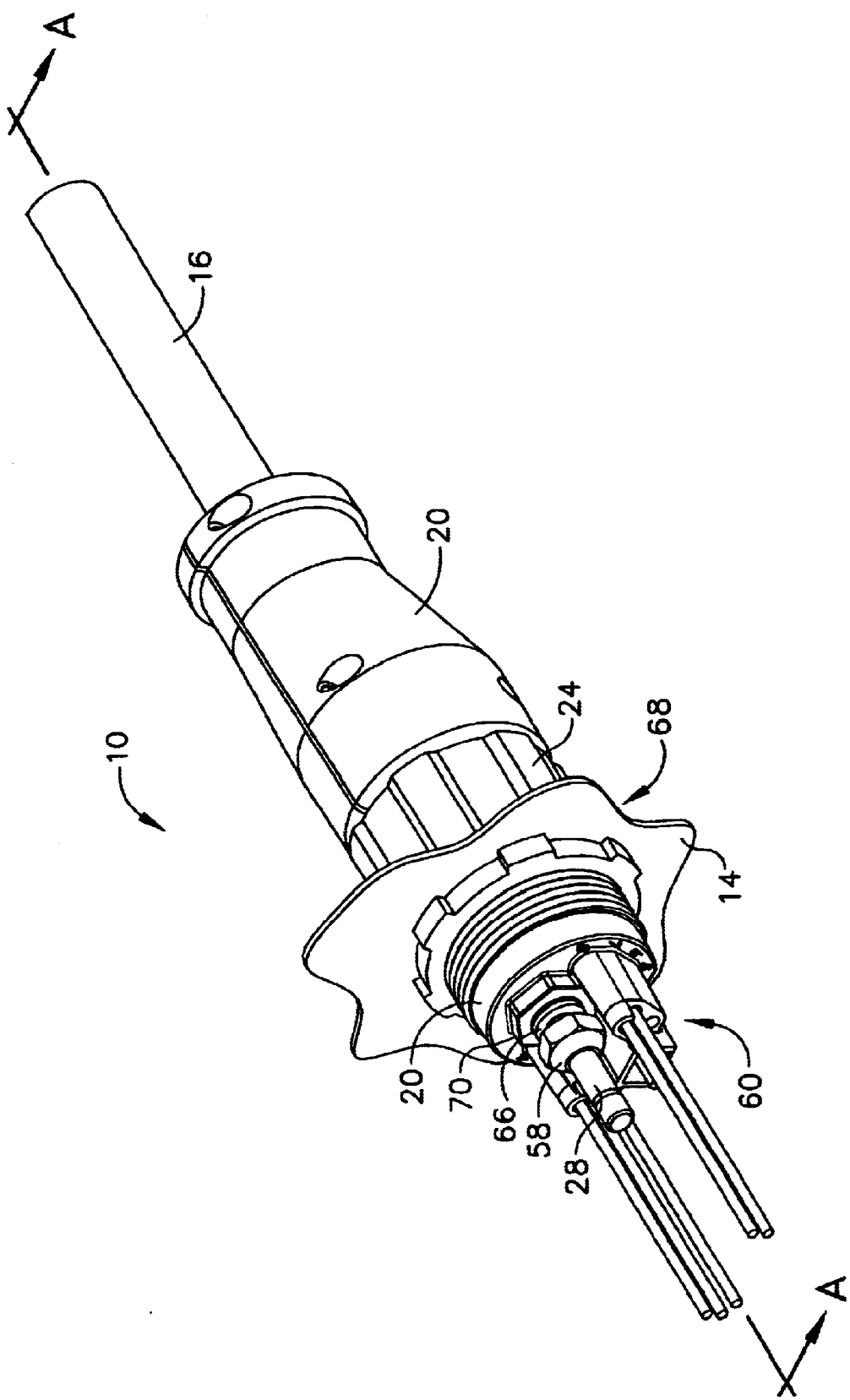
FIG. 2 is a perspective view of an embodiment of a quick disconnect fully engaged and constructed in accordance with the principles of the present invention.
Figure 3:
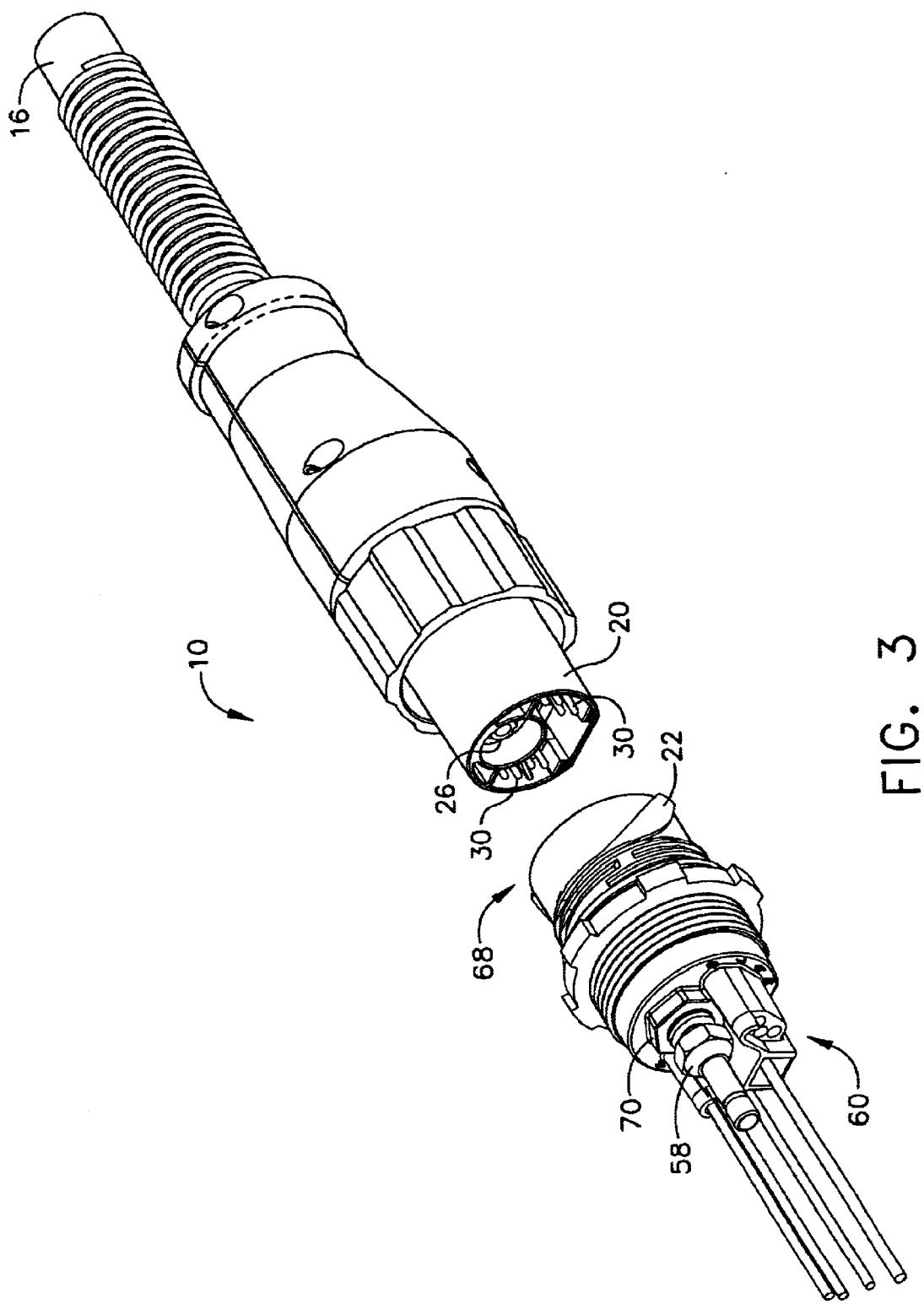
FIG. 3 is a perspective view of an embodiment of a quick disconnect fully disengaged and constructed in accordance with the principles of the present invention.
Figure 4:
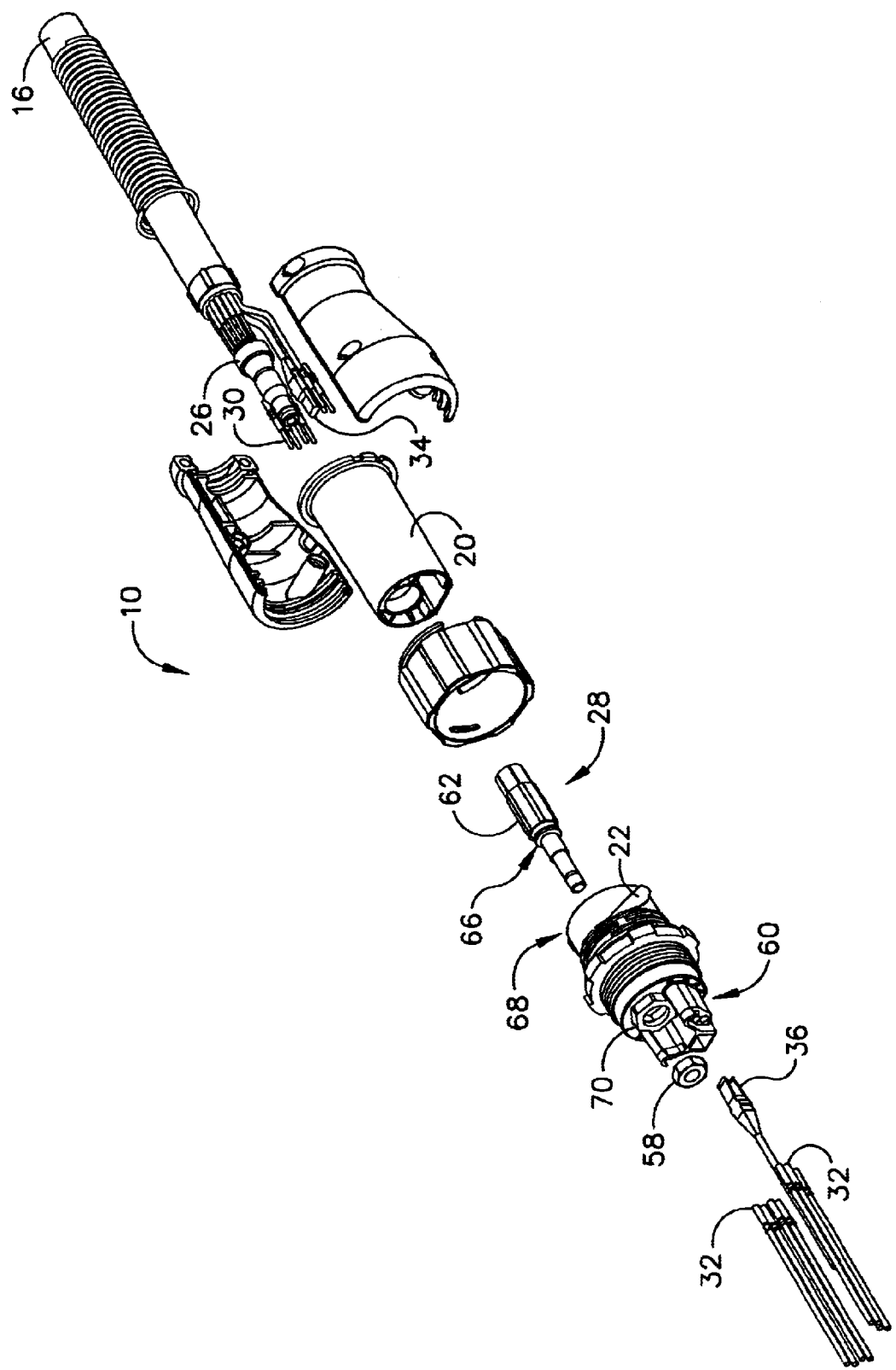
FIG. 4 is an exploded perspective view of an embodiment of a quick disconnect constructed in accordance with the principles of the present invention.

Referring now to FIGS. 2 through 4, the quick disconnect 10 according to one form of the present invention comprises a plug housing 20 engaged within a socket housing 22, wherein a locking ring 24 disposed around the plug housing 20 secures the plug housing 20 to the socket housing 22. As further shown, a plurality of conductors are disposed within the plug housing 20 and the socket housing 22, which include but are not limited to, a negative lead gas carrying pin 26 secured within the plug housing 20 that engages a main power socket 28 secured within the socket housing 22, a plurality of signal pins 30 secured within the plug housing 20 that engage a plurality of signal sockets 32 secured within the socket housing 22, and a pilot return pin 34 secured within the plug housing 20 that engages a pilot return socket 36 secured within the socket housing 22.

Generally, the negative lead gas carrying pin 26 and the main power socket 28 conduct both fluid and high current from the power supply 14, through the torch lead 16, and to the torch 12. As shown, the negative lead gas carrying pin 26 and main power socket 28 are positioned off-center to provide additional volume for the signal pins 30 and the signal sockets 32, along with the pilot return pin 34 and the pilot return socket 36, thereby resulting in a relatively compact quick disconnect 10. Further, the signal pins 30 and the signal sockets 32 conduct electricity for certain operations of the torch 12 such as a trigger switch, electrical grounding, and/or a parts-in-place switch, among others. Additionally, the pilot return pin 34 and the pilot return socket 36 conduct electricity that initiates a pilot arc for initiation of a plasma stream at the torch 12, which is generated as the gas is ionized by the high current.

As further shown, the negative lead gas carrying pin 26 and the main power socket 28, along with the signal pins 30 and signal sockets 32, and the pilot return pin 34 and the pilot return socket 36 are recessed within their respective housings in order to minimize damage thereto during engagement and/or disengagement of the quick disconnect 10. Further, both the plug housing 20 and the socket housing 22 have mating shapes, preferably a D-configuration as shown, to align and orient the plug housing 20 and the socket housing 22, thereby aligning the various conductors, for proper engagement of the quick disconnect 10.

Figure 5:
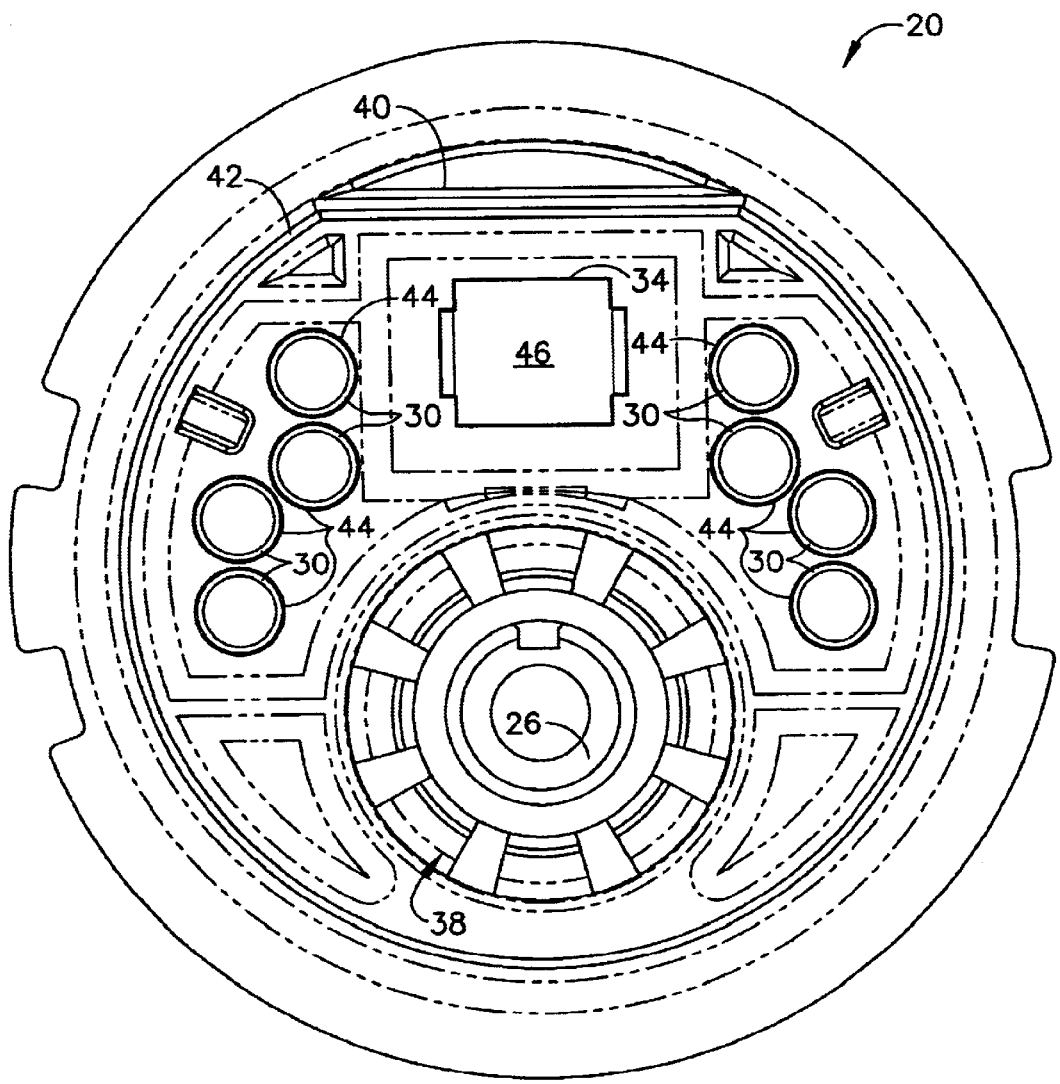
FIG. 5 is an end view of an embodiment of a plug housing constructed in accordance with the principles of the present invention.

With reference to FIG. 5, the various conductors secured within the plug housing 20 are shown in greater detail. As illustrated, the conductors comprise the negative lead gas carrying pin 26, which is positioned off-center as shown, the plurality of signal pins 30, and the pilot return pin 34. In addition, the plug housing 20 further comprises a hollow internal channel 38 in which the negative lead gas carrying pin 26 is secured, as described in greater detail below. Moreover, the plug housing 20 defines a D-configuration as previously set forth with the combination of a flat portion 40 and a contiguous curved portion 42 as shown. Furthermore, the plug housing 20 comprises a plurality of signal pin channels 44, wherein the signal pins 30 are disposed, and a pilot return socket 46, wherein the pilot return pin 34 is disposed. Preferably, the signal pins 30 as shown conduct electric power for a torch trigger switch, a parts-in-place switch, a shield cup ground, a main ground, and certain other components within the torch 12 (not shown).

Figure 6:
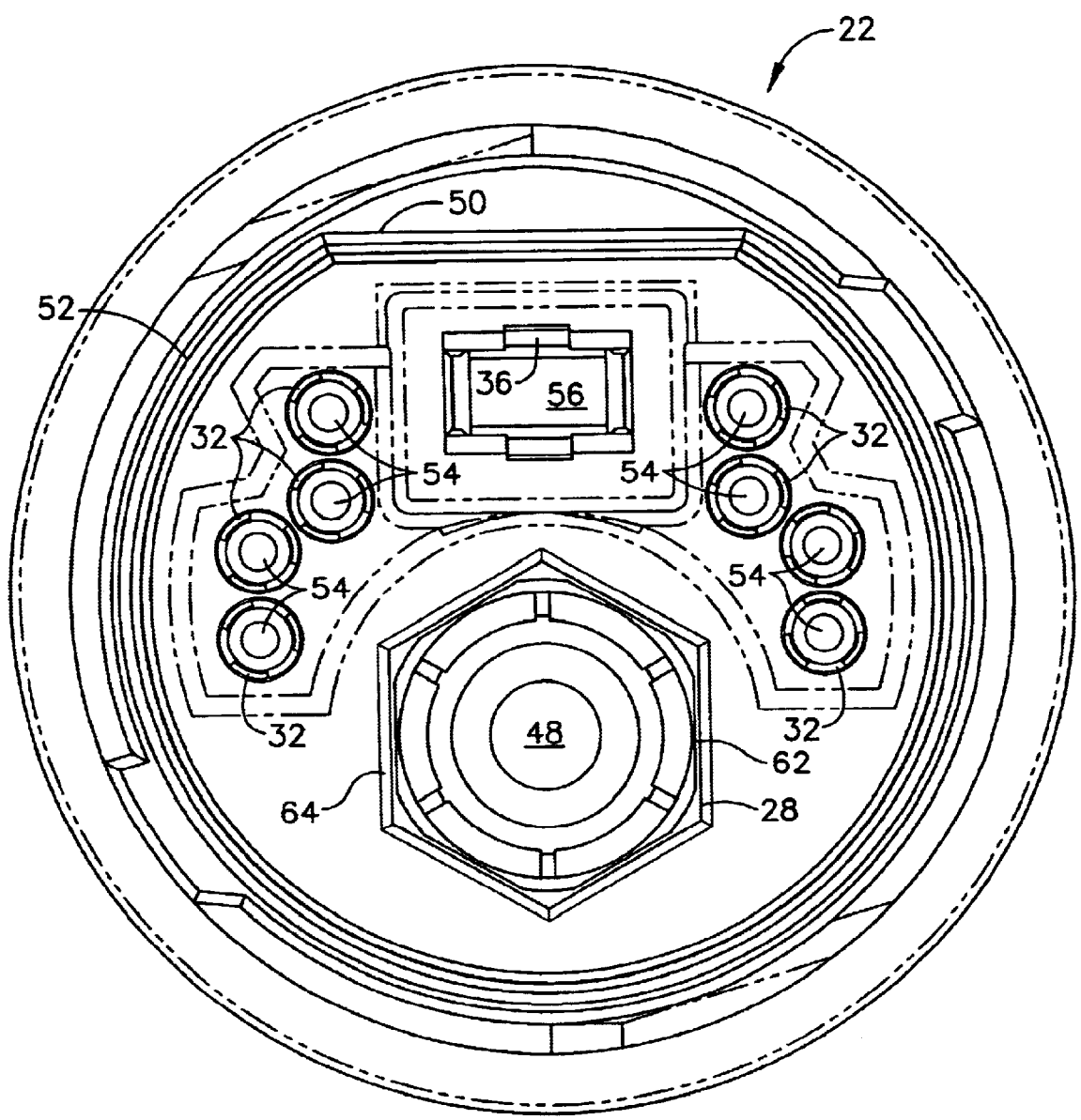
FIG. 6 is an end view of an embodiment of a socket housing constructed in accordance with the principles of the present invention.

Referring now to FIG. 6, the various conductors secured within the socket housing 22 are shown in greater detail. As illustrated, the conductors comprise the main power socket 28, which is positioned off-center as shown, the plurality of signal sockets 32, and the pilot return socket 36. Additionally, the socket housing 22 further comprises a main power socket aperture 48 in which the main power socket 28 is disposed, along with a D-configuration as previously set forth with the combination of a flat portion 50 and a contiguous curved portion 52. Further, the socket housing 22 also comprises a plurality of signal pin apertures 54, wherein the signal sockets 32 are disposed, and a pilot return aperture 56, wherein the pilot return socket 36 is disposed.

Referring back to FIGS. 2 through 4, and also to FIG. 6, the main power socket 28 is preferably secured within the socket housing 22 through a threaded connection with a nut 58 disposed at a distal end 60 of the socket housing 22. As shown, the main power socket 28 defines hexagonal sides 62 that engage a hexagonal shoulder 64 within the socket housing 22. Further, the main power socket 28 defines a threaded portion 66 as shown. Accordingly, the main power socket 28 is inserted through a proximal end 68 of the socket housing 22, through the main power socket aperture 48, until the hexagonal sides 62 engage the hexagonal shoulder 64 within the socket housing 22. Further, the nut 58 engages the thread portion 66 of the main power socket 28 and is tightened against a boss 70 positioned proximate the main power socket aperture 48 to secure the main power socket 28 within the socket housing 22.

Figure 7:
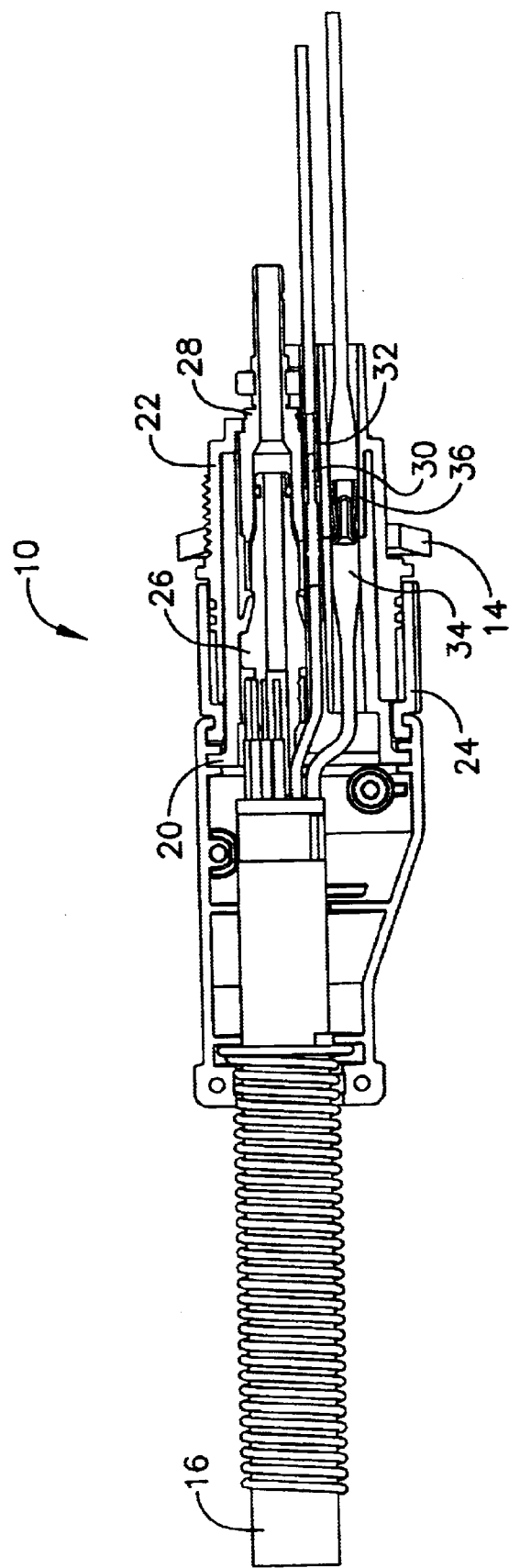
FIG. 7 is a cross-sectional view, taken along plane A—A of FIG. 2, of an embodiment of a socket housing constructed in accordance with the principles of the present invention.

Referring now to FIG. 7, the connections between the various conductors within the quick disconnect 10 are further illustrated. As shown, the plug housing 20 engages the socket housing 22, wherein locking ring 24 engages the socket housing 22 to fully engage the quick disconnect 10. Further, the negative lead gas carrying pin 26 engages the main power socket 28, the signal pins 30 (only one shown) engage the signal sockets 32 (only one shown), and the pilot return pin 34 engages the pilot return socket 36. Accordingly, a relatively compact quick disconnect 10 is provided, which further comprises additional features that facilitate a safe, efficient, and easy to use quick disconnect 10 as described in greater detail below.

Signal Pin Shroud

Figure 8:
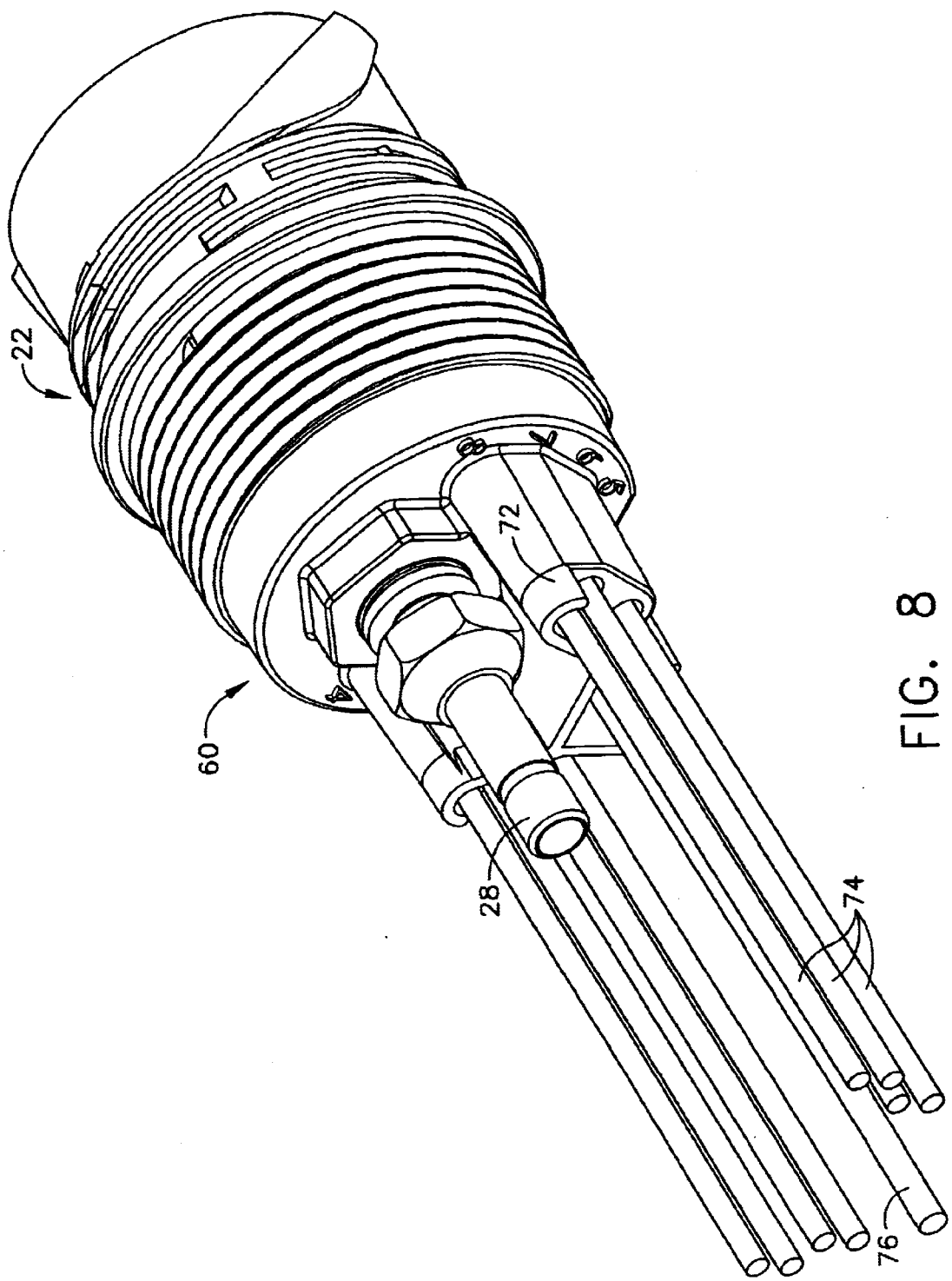
FIG. 8 is an enlarged perspective view of a distal end of an embodiment of a socket housing constructed in accordance with the principles of the present invention.
Figure 9:
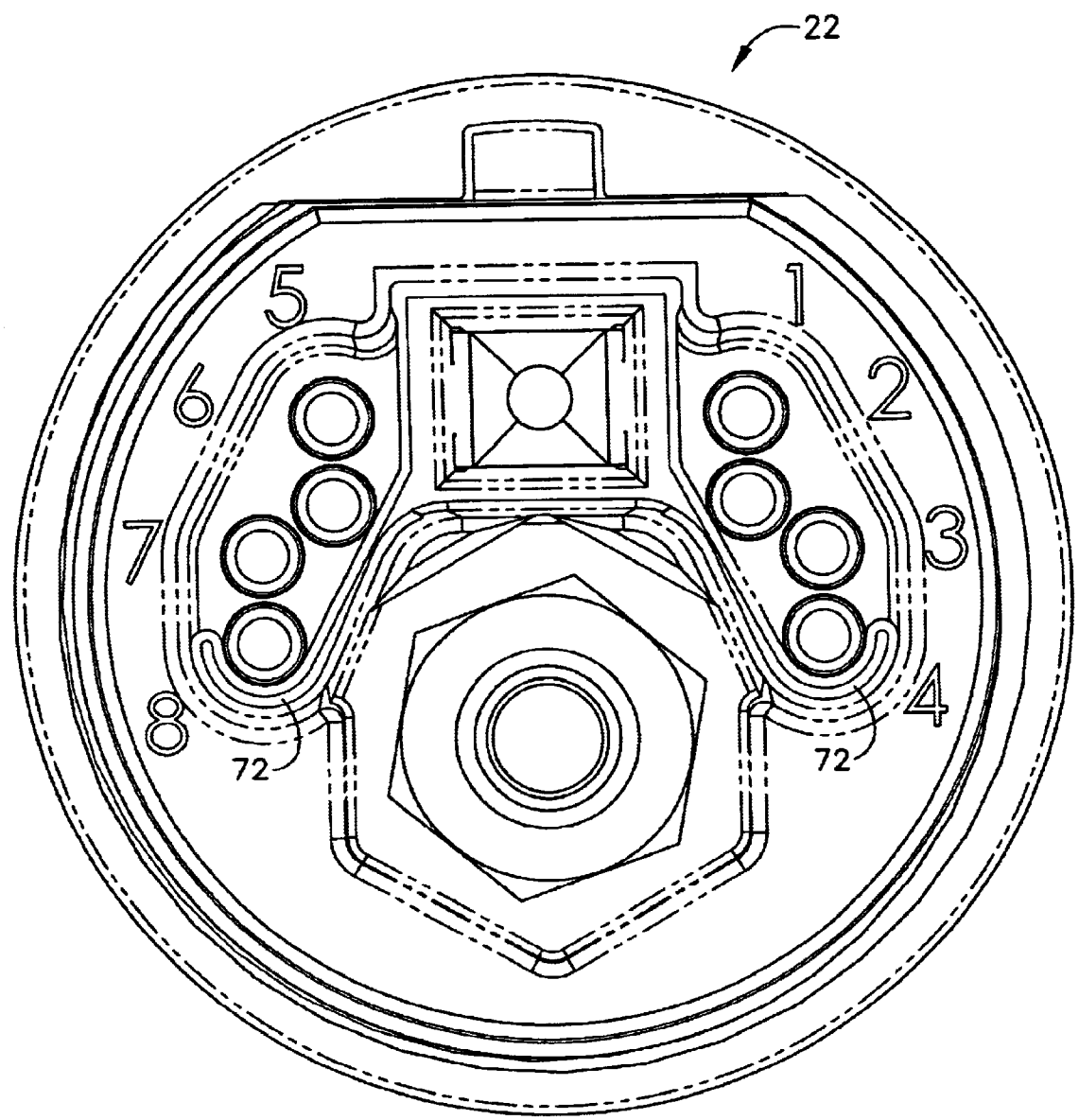
FIG. 9 is an end view of a distal end of an embodiment of a socket housing constructed in accordance with the principles of the present invention.

Referring now to FIGS. 8 and 9, the socket housing 22 further comprises a signal pin shroud 72 as shown, which provides a dielectric barrier between the signal conductors 74, the pilot return conductor 76, and the main power socket 28, wherein the pilot return conductor 76 and the main power socket 28 are relatively high voltage conductors. As shown, the signal pin shroud 72 protrudes out from the distal end 60 of the socket housing 22 and follows a general profile around and between the signal conductors 74, the pilot return conductor 76, and the main power socket 28. In one preferred form, the signal pin shroud 72 protrudes out approximately 0.156 inches (0.062 mm) from the distal end 60 of the socket housing 22.

The signal pin shroud 72 physically separates the main power socket 28 from the pilot return conductor 76 and the signal conductors 74. As shown, the signal pin conductors 74 are arranged on opposite sides of the pilot return conductor 76, with a wing of the signal pin shroud 72 extending from the pilot return conductor 76 between the signal conductors 74 and the main power socket 28, and curling around the signal conductors 74 on each side. Additionally, the signal pin shroud 72 is integrally formed within the socket housing 22 in one form of the present invention, although the signal pin shroud 72 may alternately be a separate component.

Main Power Socket Undercut

Figure 10:
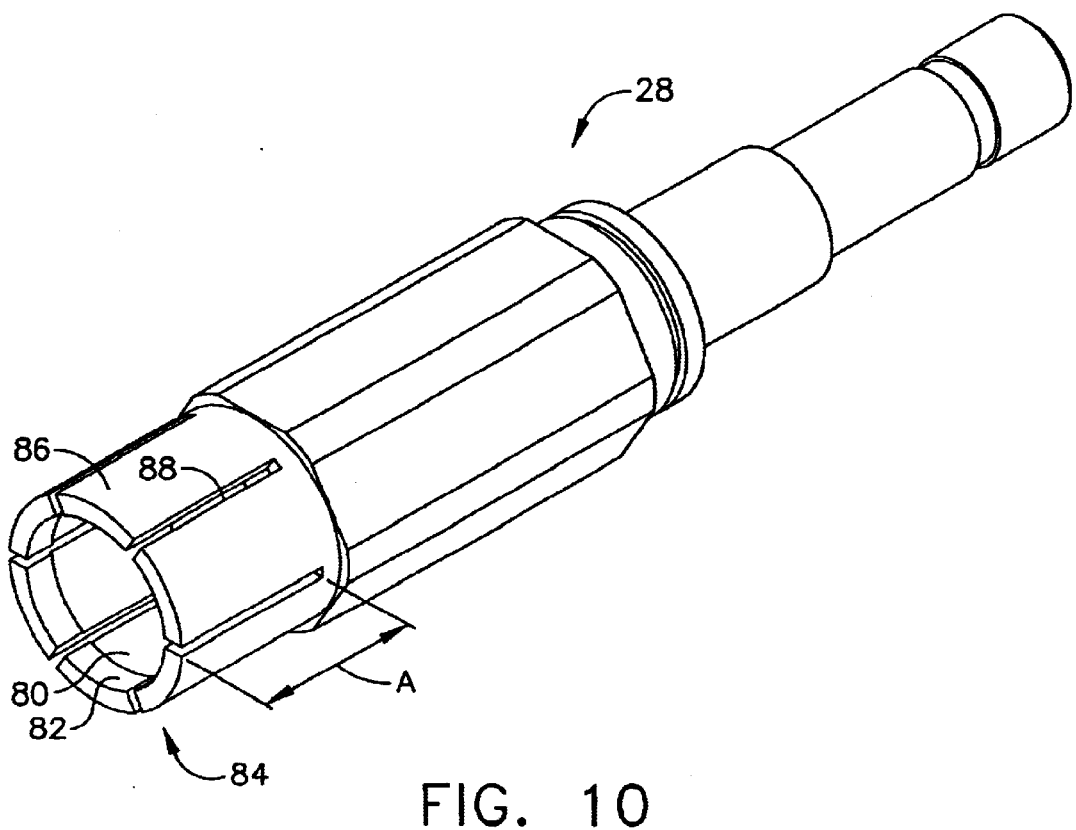
FIG. 10 is an enlarged perspective view of a proximal end of an embodiment of a main power socket constructed in accordance with the principles of the present invention.
Figure 11:
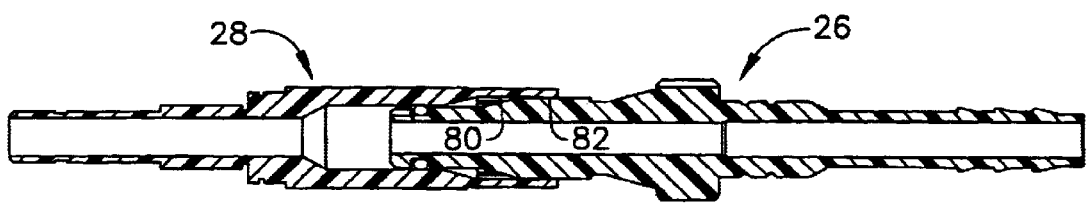
FIG. 11 is a cross-sectional view of an embodiment of a negative lead gas carrying pin engaged within a main power socket, illustrating a main power socket undercut and constructed in accordance with the principles of the present invention.

With reference to FIGS. 10 and 11, the main power socket 28 according to one form of the present invention preferably comprises an undercut 80 on an interior surface thereof that defines radial contact pads 82 disposed at a proximal end 84 of the main power socket 28. Further, the main power socket 28 comprises a plurality of fingers 86 separated by axial slots 88 that define a length A. Accordingly, the radial contact pads 82 engage the negative lead gas carrying pin 26 over a relatively small area defined by the radial contact pads 82, thereby reducing the length of the axial slots 88 required for full engagement of the negative lead gas carrying pin 26.

Conversely, without the undercut 80 and corresponding radial contact pads 82, the axial slots 88 would be required to be longer in order to fully engage the negative lead gas carrying pin 26, which would result in a longer main power socket 28. As a result, the size of the main power socket 28 is reduced, thereby contributing to the relatively compact quick disconnect 10 according to the present invention.

The undercut 80 as shown is preferably machined into the main power socket 28, which is preferably made of a brass material, in order to produce the radial contact pads 82. Alternately, the radial contact pads 82 could be integrally formed with the main power socket 28, or the radial contact pads 82 could be separate components that are secondarily attached to the main power socket 28, using, for example, adhesive bonding.

Dual Pitch Locking Threads

Figure 12A:
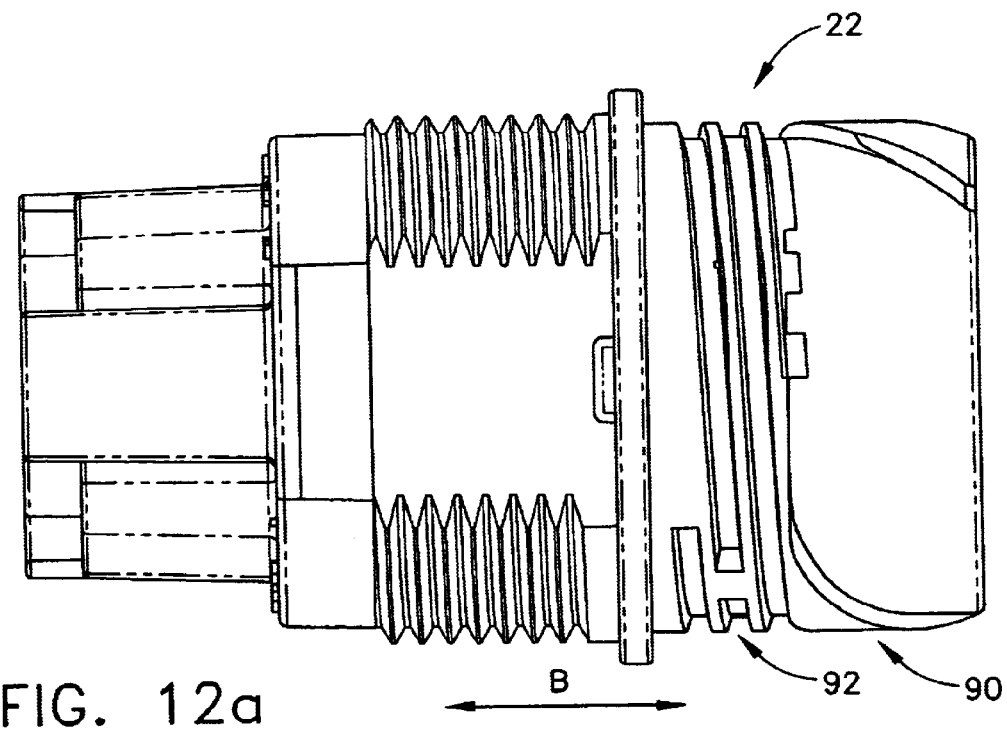
FIG. 12a is an enlarged side view of an embodiment of a socket housing constructed in accordance with the principles of the present invention.
Figure 12B:
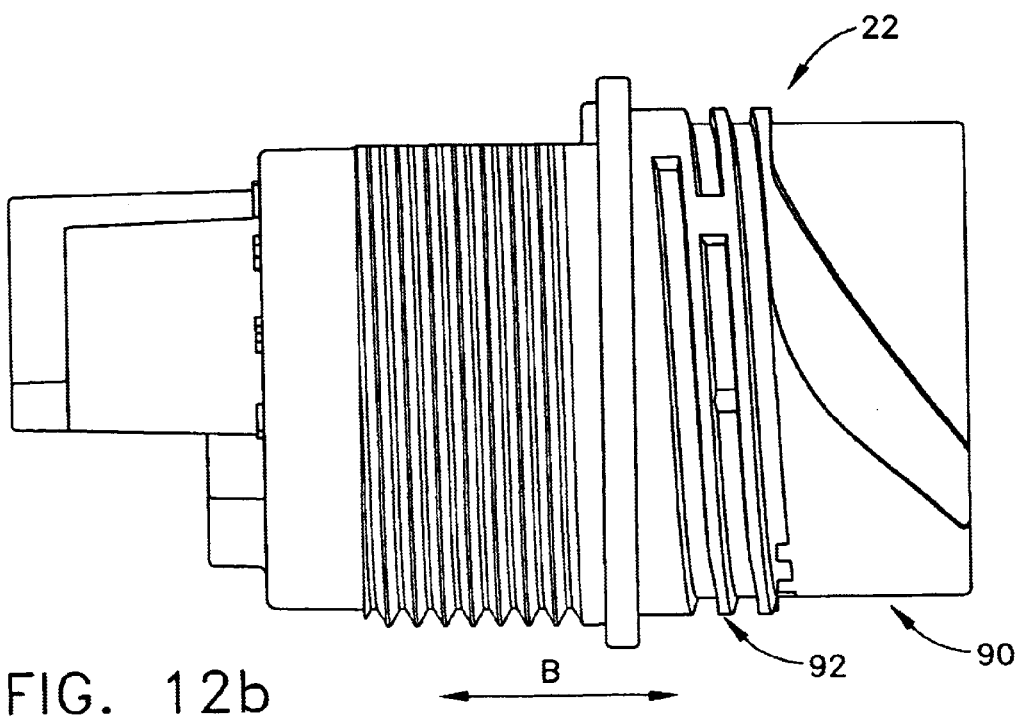
FIG. 12b is an enlarged side view of an embodiment of a socket housing, rotated 90° from FIG. 12a, constructed in accordance with the principles of the present invention.

Referring now to FIGS. 12a and 12b, the socket housing 22 further defines a first threaded portion 90 and a second threaded portion 92 along a length B of the socket housing 22 as shown. As illustrated, the first threaded portion 90 comprises a first pitch that is coarser than a second pitch of the second threaded portion 92, and the coarser pitch of the first threaded portion 90 smoothly transitions into the pitch of the second threaded portion 92 as shown to accommodate features of the locking ring 24 as described in further detail below.

Figure 13:
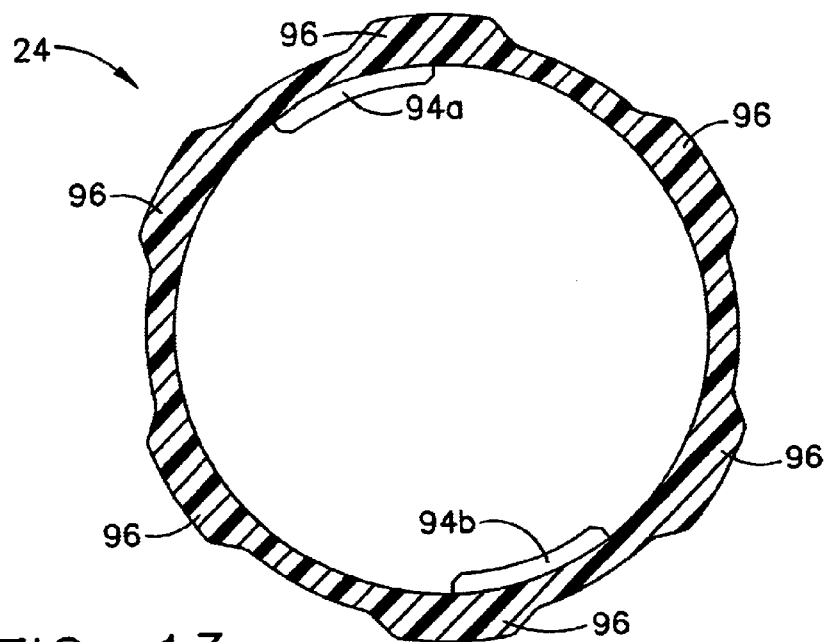
FIG. 13 is an end view of an embodiment of a locking ring constructed in accordance with the principles of the present invention.

Accordingly, FIG. 13 illustrates a feature of the locking ring 24 that engages the first threaded portion 90 and the second threaded portion 92 of the socket housing 22, which generally comprises a thread engagement member 94 as shown. Preferably, the thread engagement member 94 comprises two radial protrusions 94a and 94b that engage the first threaded portion 90 and the second threaded portion 92 as the locking ring 24 is engaged and rotated around the socket housing 22. As shown, the radial protrusions 94a and 94b are diametrically opposed in one preferred form of the present invention. Further, the radial protrusions 94a and 94b define an arcuate shape along the interior of the locking ring 24. Accordingly, the radial protrusions 94a and 94b engage the first threaded portion 90 and the second threaded portion 92 when the locking ring 24 is rotated in operation as described in further below.

As further shown, the locking ring 24 preferably comprises an exterior surface defining a plurality of axial ridges 96, preferably six (6) as shown, for gripping the locking ring 24 during operation. Accordingly, a user is able to more easily grip and turn the locking ring 24 during operation as the thread engagement member 94 is engaged with the first threaded portion 90 and the second threaded portion 92 of the socket housing 22.

Figure 14:
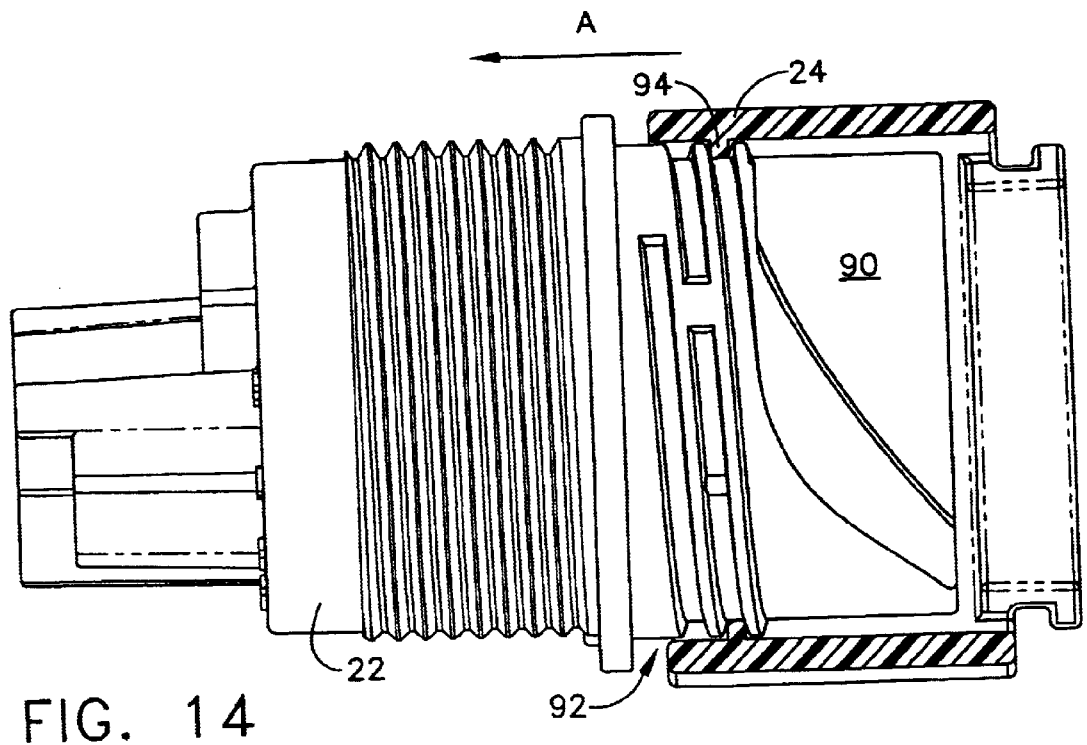
FIG. 14 is an enlarged side cross sectional view, taken along plane A—A of FIG. 2, of an embodiment of a locking ring engaging a socket housing and constructed in accordance with the principles of the present invention.

Referring now to FIG. 14, the locking ring 24 is shown engaged with the socket housing 22 and is rotated such that the thread engagement member 94 engages the first threaded portion 90 and then the second threaded portion 92 as the locking ring 24 travels along a length A' of the socket housing 22. Since the first threaded portion 90 comprises a coarser pitch than the second threaded portion 92, the locking ring 24 engages the socket housing 22 with a relatively small rotation of the locking ring 24. Therefore, relatively small rotations of the locking ring 24 results in a relatively large amount of axial travel along length B of the socket housing 22. As the thread engagement member 94 transitions into the second threaded portion 92, the locking ring 24 engages the socket housing 22 with a relatively large rotation of the locking ring 24, wherein relatively large rotations of the locking ring 24 results in a relatively small amount of axial travel along length B of the socket housing 22. Accordingly, the thread engagement member 94 engages the first threaded portion 90 and the second threaded portion 92 to secure the locking ring 24 to the socket housing 22 with a varying amount of axial travel per rotation of the locking ring 24 that corresponds with the pitches of the first threaded portion 90 and the second threaded portion 92. As a result, the quick disconnect 10 is relatively simple to engage and operate through the first threaded portion 90 and further provides a robust and reliable connection through the second threaded portion 92.

Preferably, the socket housing 22 and the locking ring 24 are fabricated from a polymeric composition such as a fiber-filled nylon, (e.g., Nylon 66), although other materials commonly known in the art may be employed according to specific design requirements. Furthermore, the first threaded portion 90 comprises a pitch of approximately ½ thread per inch, and the second threaded portion 92 comprises a pitch of approximately four (4) threads per inch in one form of the present invention. Accordingly, approximately ¼ of a turn of the locking ring 24 allows the thread engagement member 94 to traverse through the first threaded portion 90, and approximately ¾ of a turn of the locking ring 24 allows the thread engagement member 94 to traverse through the second threaded portion 92 in one preferred form of the present invention.

Figure 15:
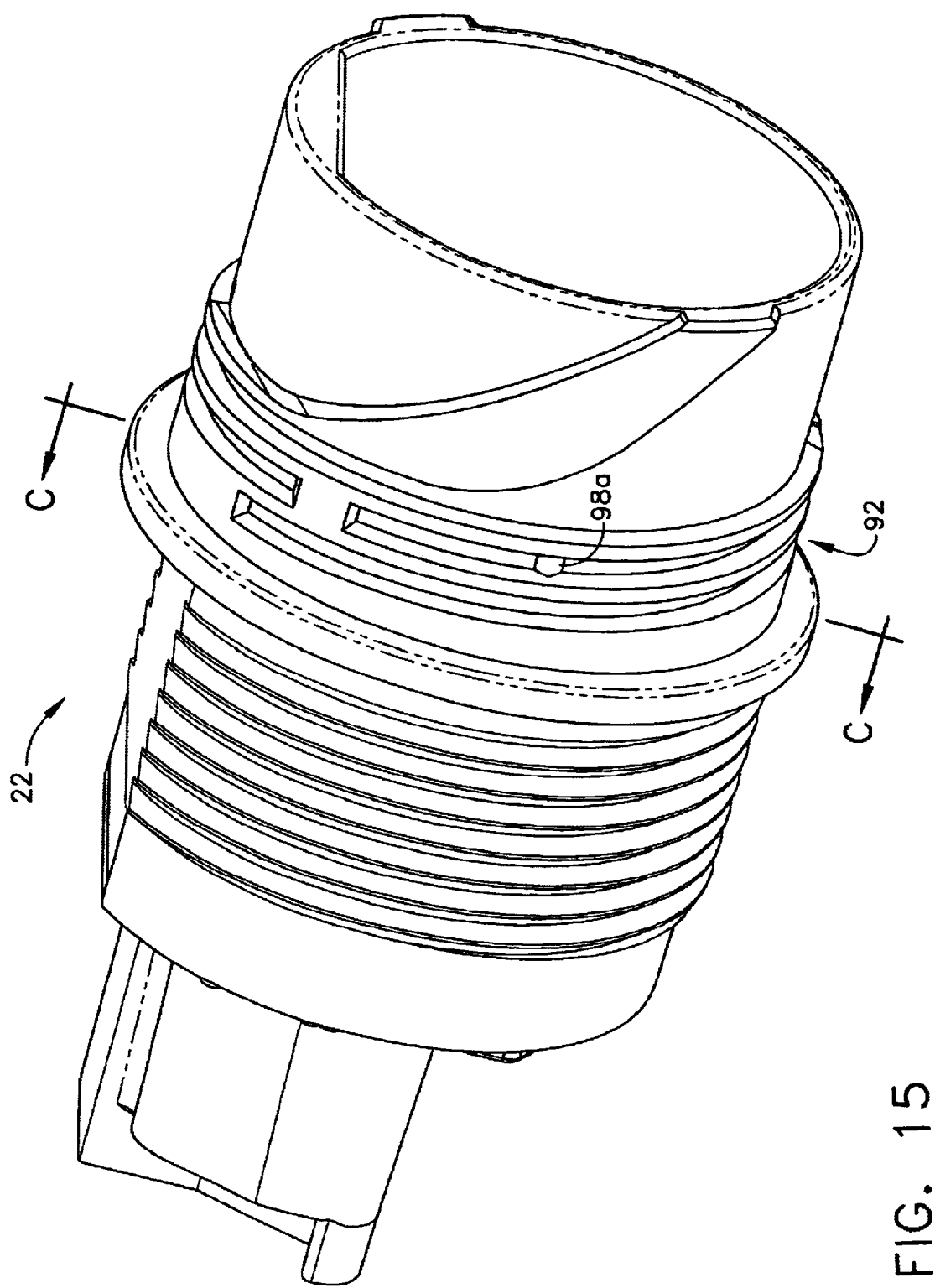
FIG. 15 is an enlarged perspective view of an embodiment of a socket housing constructed in accordance with the principles of the present invention.

Referring now to FIG. 15, the socket housing 22 of the present invention further comprises thread protrusions 98a and 98b (98b hidden from view) disposed within the second threaded portion 92. Accordingly, the radial protrusions 94a and 94b of the locking ring 24 as previously described engage the thread protrusions 98a and 98b as the locking ring 24 is rotated to provide an audible and tactile indication of a fully mated condition as described in greater detail below. Accordingly, the thread protrusions 98a and 98b are preferably diametrically opposed similar to the diametrically opposed radial protrusions 94a and 94b.

Referring to FIG. 16, the thread protrusions 98a and 98b preferably define first and second sloped surfaces, 100 and 102, respectively. Accordingly, the first and second sloped surfaces 100 and 102 allow the thread engagement member 94 (not shown) to pass over the thread protrusions 98a and 98b more easily as the locking ring 24 is rotated as further described below.

Figure 17B:
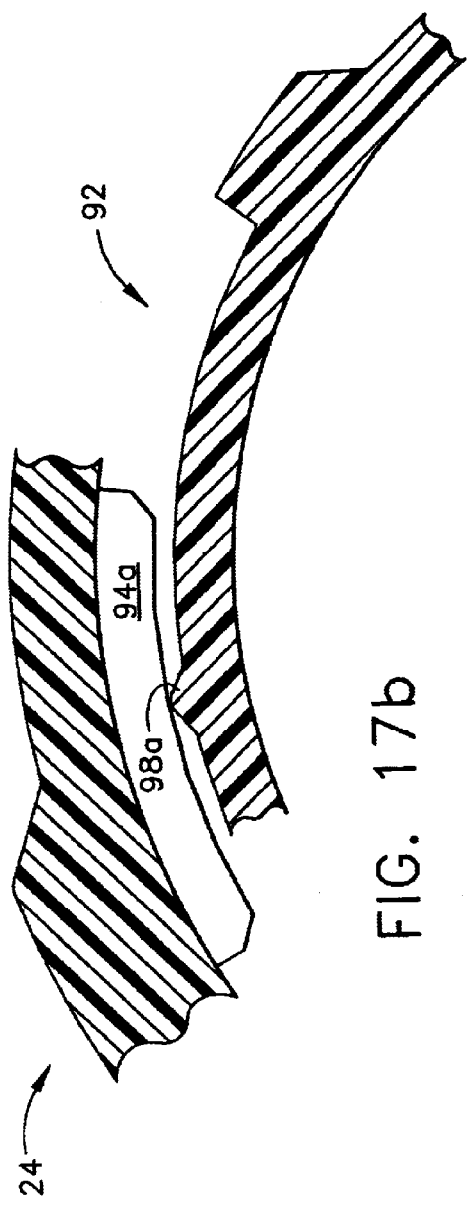
FIG. 17b is a partial cross-sectional view of an embodiment of a radial protrusion traveling over a thread protrusion and constructed in accordance with the principles of the present invention.
Figure 17C:
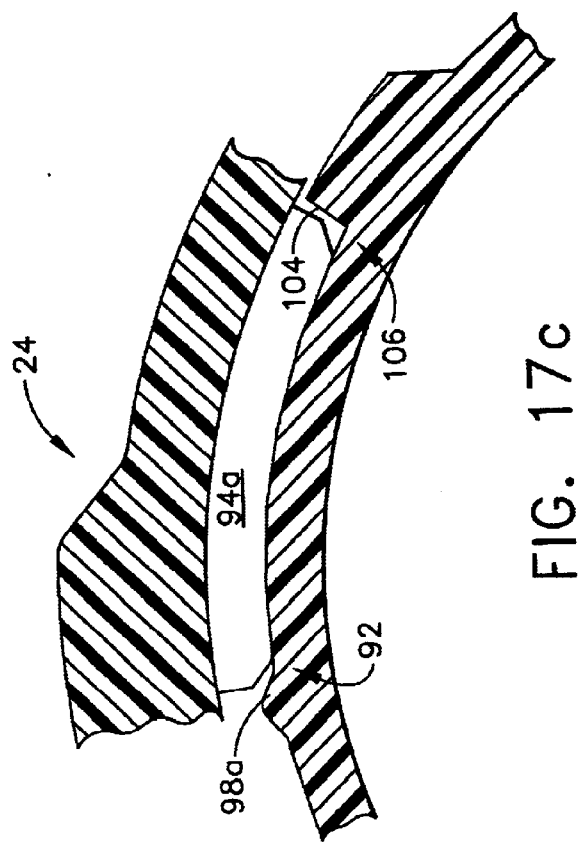
FIG. 17c is a partial cross-sectional view of an embodiment of a radial protrusion engaged over a thread protrusion and engaging a lateral stop in accordance with the principles of the present invention.

Referring now to FIGS. 17a through 17c, a radial protrusion 94a is shown engaging a thread protrusion 98a as the locking ring 24 is rotated in the direction of arrow B. As the locking ring 24 is rotated, the radial protrusion 94a travels over the thread protrusion 98a and is eventually seated within the second threaded portion 92 past the thread protrusion 98a as shown in FIG. 17c. Accordingly, a slight deformation of the locking ring 24 occurs as the radial protrusion 94a passes over the thread protrusion 98a as shown in FIG. 17b. Further, the socket housing 22 preferably comprises a lateral stop 104 as shown in FIG. 17c disposed at an end 106 of the second threaded portion 92 in order to further limit travel of the locking ring 24.

As the radial protrusions 94a encounter the thread protrusions 98a, the sloped surfaces 100 and 102 cam the radial protrusions 94a upward as the locking ring 24 continues to be rotated. Further, the radial protrusions 94a pass the thread protrusions 98a and snap back into the second threaded portion 92, thereby providing an audible and/or tactile confirmation that the connection has been made. Accordingly, at least one of the radial protrusions 94a remains trapped in the second threaded portion 92 between a thread protrusion 98a and the lateral stop 104. Similarly, when disconnecting the quick disconnect 10, the radial protrusions 94a are cammed over the thread protrusions 98a by the sloped surfaces 100 and 102. After passing the thread protrusions 98a, the radial protrusions 94a can freely pass through the second threaded portion 92 and the first threaded portion 90 so that the plug housing 20 may be removed from the socket housing 22.

In another form of the present invention, the socket housing 22 comprises multiple threaded portions (not shown) rather than only a first threaded portion and a second threaded portion as previously described. Accordingly, the multiple threaded portions extend along a length A of the socket housing 22, wherein each successive threaded portion along the length A comprises a pitch that is different, i.e. finer or coarser, than a pitch of a previous threaded portion. Similarly, the locking ring 24 comprises a thread engagement member that engages the multiple threaded portions to secure the locking ring 24 to the socket housing 22 with a varying amount of axial travel per rotation of the locking ring 24 that corresponds with the pitches of the multiple threaded portions. Further, the socket housing 22 similarly comprises thread protrusions and a lateral stop, and the locking ring 24 comprises radial protrusions as previously described to engage the locking ring 24 with the socket housing 22. Moreover, the thread engagement member may be internal to the locking ring 24 as the multiple threaded portions are external to the socket housing 22, or alternately, the thread engagement member may be external to the locking ring 24 as the multiple threaded portions are internal to the socket housing 22 (not shown).

In yet another form of the present invention, a connector is provided that employs threads of varying pitch as previously described without the use of a locking ring 24, wherein a first component is connected to a second component through multiple threaded portions and a thread engagement member similar to those previously described. Accordingly, the second component defines multiple threaded portions extending along a length thereof, wherein each successive threaded portion along the length comprises a pitch that is different, i.e., coarser or finer, than a pitch of a previous threaded portion. Further, the first component defines a thread engagement member, wherein the thread engagement member engages the multiple threaded portions to secure the first component to the second component with a varying amount of axial travel per rotation of the first component that corresponds with the pitches of the multiple threaded portions. Therefore, a connector is provided that is relatively simple to engage and operate while providing a robust and reliable connection without the use of a locking ring 24 as previously described.

Similarly, the connector comprising a second component with multiple threaded portions may comprise thread protrusions and a lateral stop as previously described. Accordingly, the second component comprises radial protrusions that engage the thread protrusions and the lateral stop to provide an audible and tactile indication of a fully mated condition. Furthermore, the multiple threaded portions may be external or internal to the second component, which would result in the thread engagement member being internal and external, respectively, to the first component.

In another preferred form of the present invention, a method of connecting two components is provided that generally comprises the steps of engaging a first component comprising a thread engagement member with a second component comprising multiple threaded portions extending along a length of the second component, wherein each successive threaded portion along the length comprises a pitch that is different, i.e., coarser or finer, than a pitch of a previous threaded portion. The method further comprises the step of rotating the first component such that the thread engagement member engages the multiple threaded portions, wherein the thread engagement member engages the multiple threaded portions to secure the first component to the second component with a varying amount of axial travel per rotation of the first component that corresponds with the pitches of the multiple threaded portions.

Additionally, the method may comprise the step of rotating the first component until the thread engagement member engages a thread protrusion within a threaded portion, wherein an audible and tactile indication of a fully mated condition occurs. Furthermore, the method may also comprise the step of further rotating the first component until the thread engagement member engages a lateral stop at an end of a threaded portion, wherein travel of the first component is limited by the lateral stop.

Tamper Resistant Pin Connection

Figure 18:
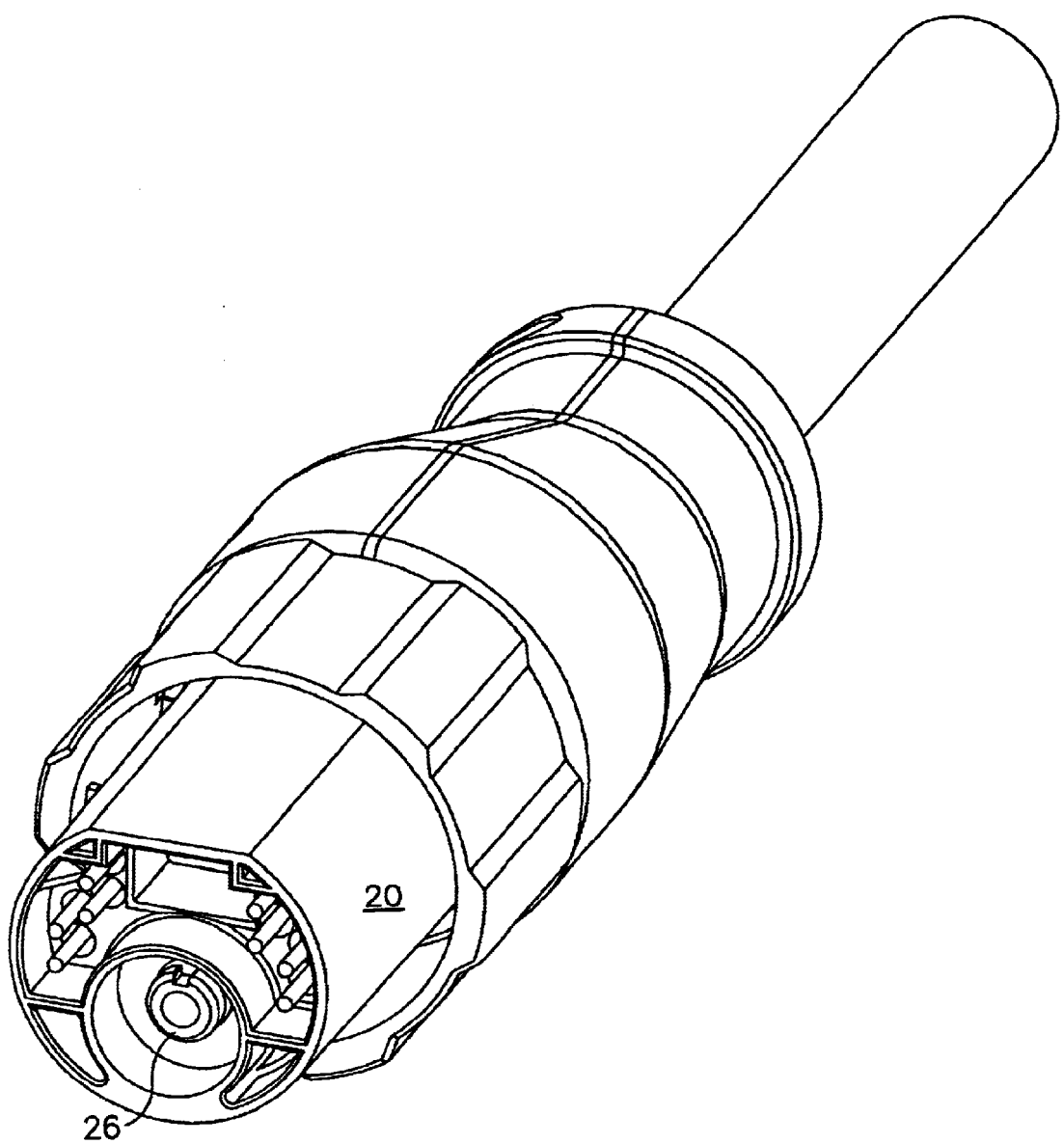
FIG. 18 is a perspective view of an embodiment of a negative lead gas carrying pin secured within a plug housing and constructed in accordance with the principles of the present invention.
Figure 19:
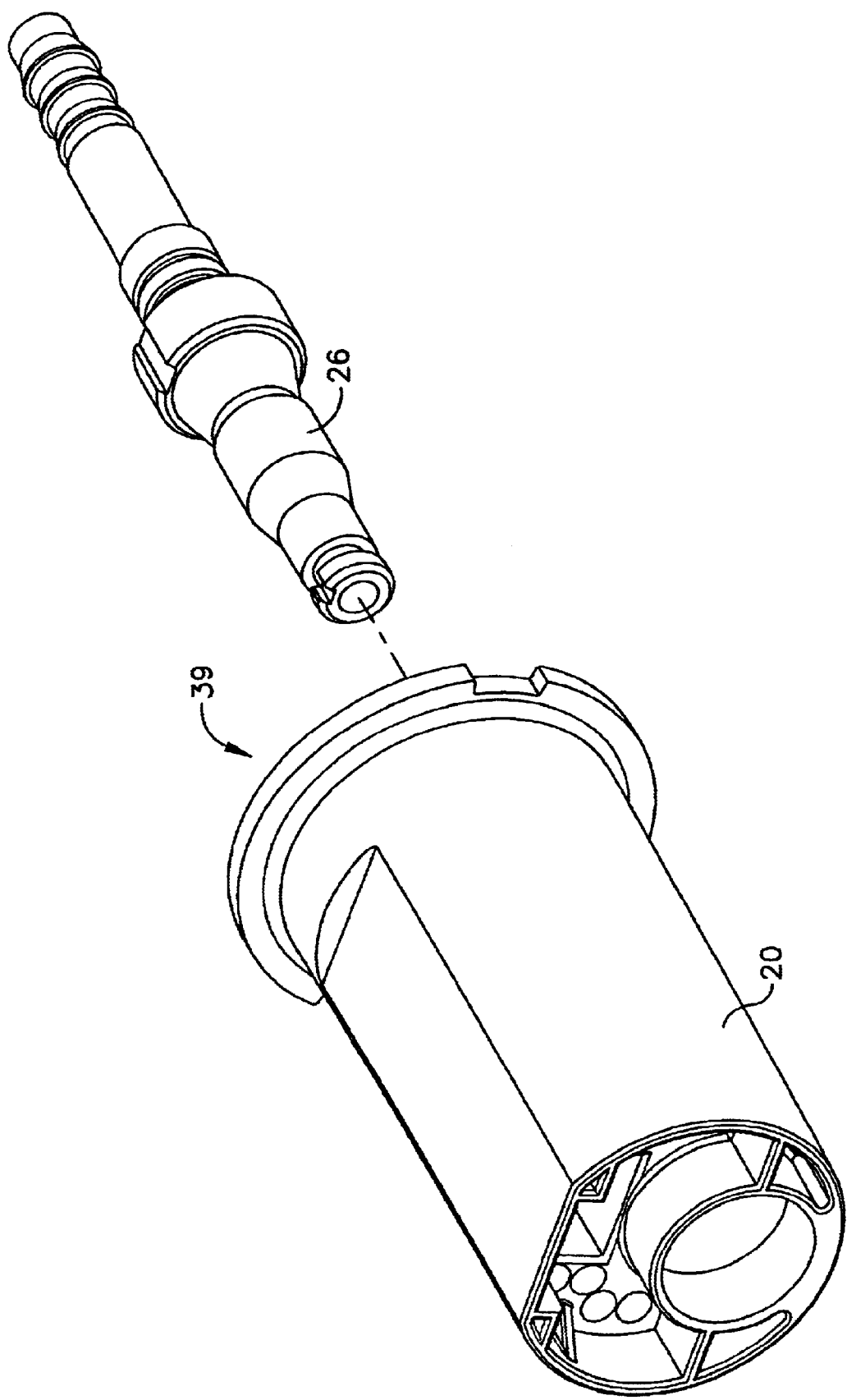
FIG. 19 is an exploded view of an embodiment of a negative lead gas carrying pin and a plug housing constructed in accordance with the principles of the present invention.

Referring now to FIGS. 18 and 19, a tamper resistant pin connection is provided between the plug housing 20 and the negative lead gas carrying pin 26. As shown, the negative lead gas carrying pin 26 is disposed within the hollow internal channel 38 of the plug housing 20, and is preferably recessed therein as shown. Further, the negative lead gas carrying pin 26 is inserted through a distal end 39 of the plug housing 20 for installation, which is described in greater detail below.

Figure 20:
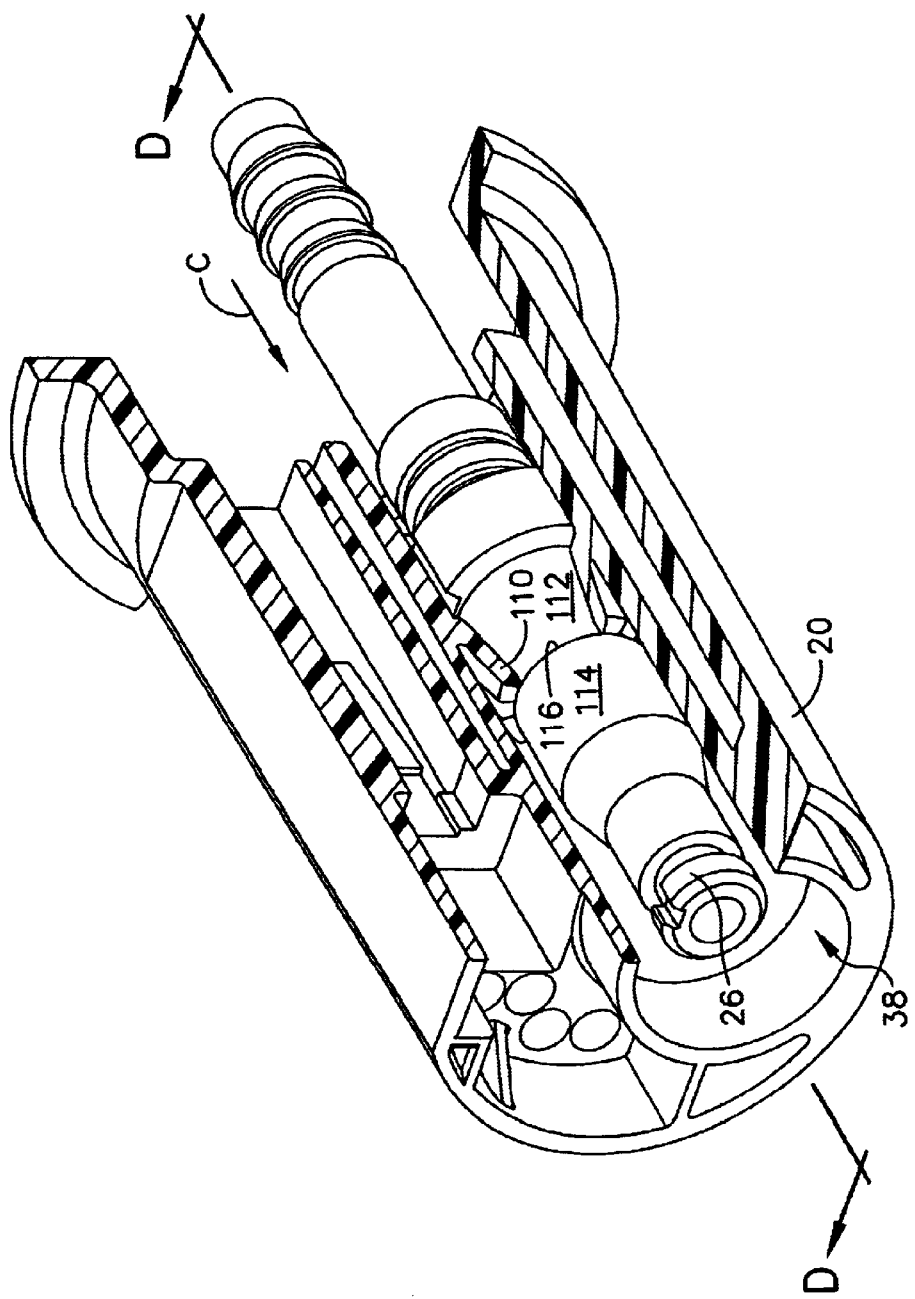
FIG. 20 is a cutaway view of an embodiment of a negative lead gas carrying pin secured within a plug housing and constructed in accordance with the principles of the present invention.
Figure 21:
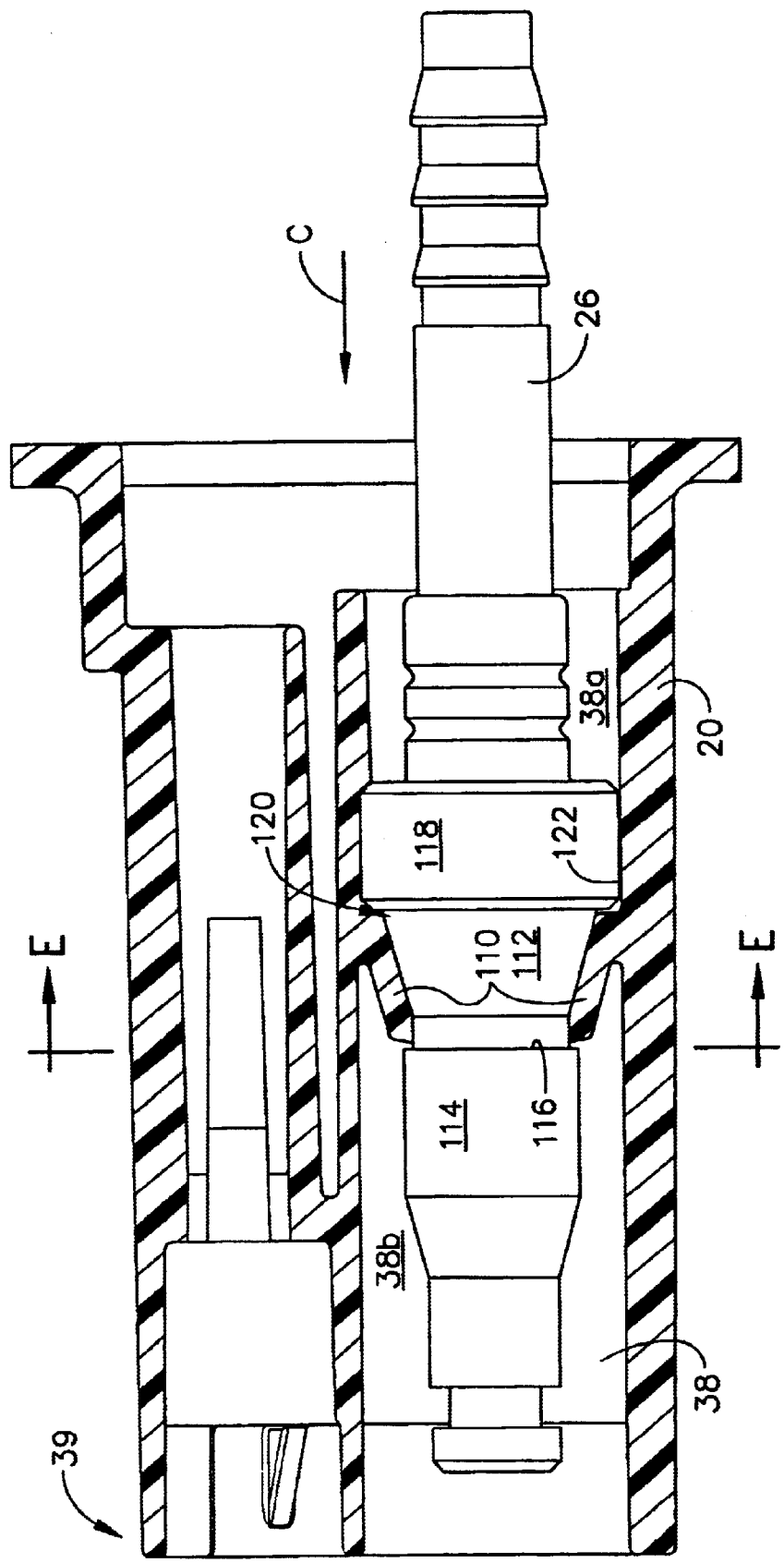
FIG. 21 is a cross-sectional view, taken along line D—D of FIG. 20, of an embodiment of a negative lead gas carrying pin secured within a plug housing and constructed in accordance with the principles of the present invention.
Figure 22:
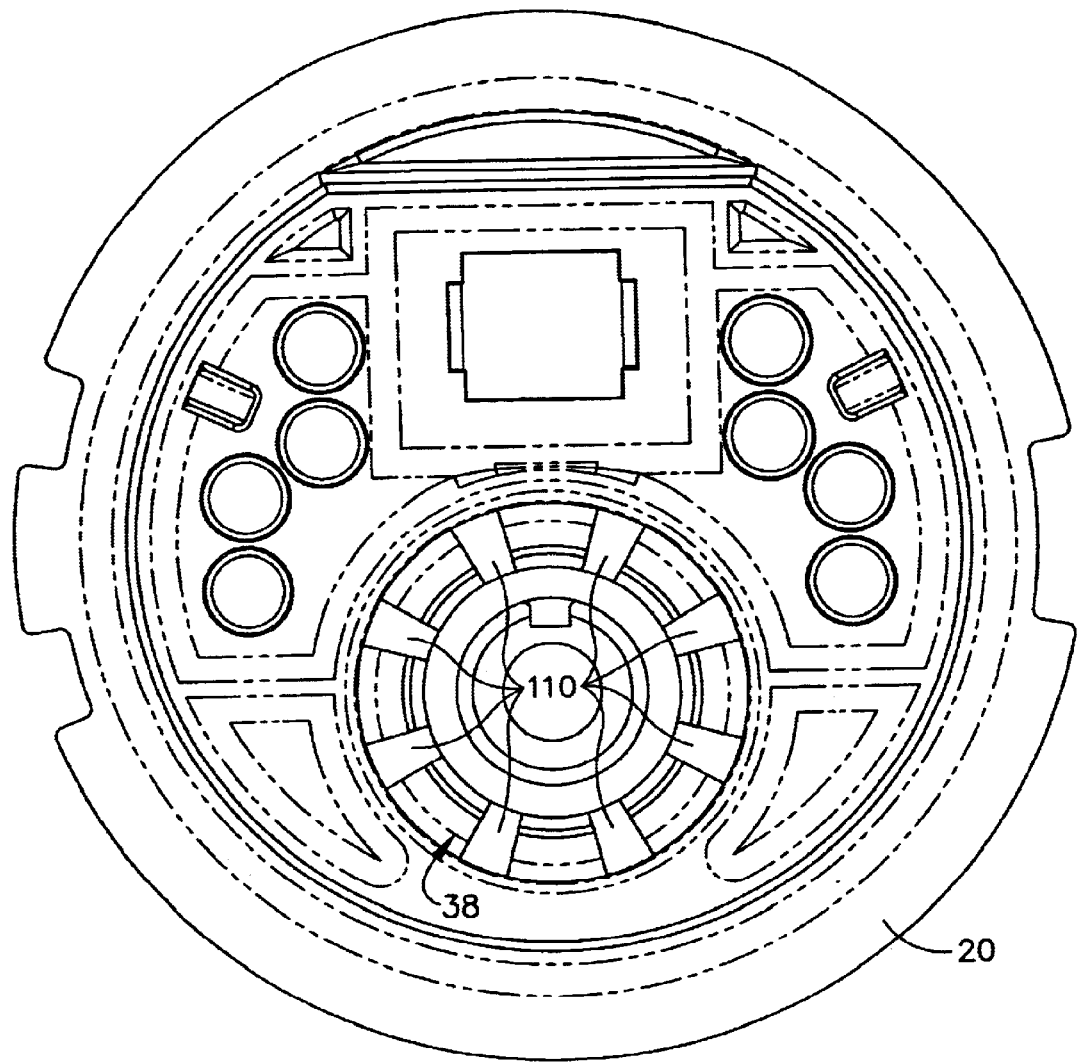
FIG. 22 is a cross-sectional view, taken along line E—E of FIG. 20, of an embodiment of a plug housing with locking fingers constructed in accordance with the principles of the present invention.

As shown in FIGS. 20 through 22, the plug housing 20 further comprises a plurality of locking fingers 110 disposed within the hollow internal channel 38. Further, the negative lead gas carrying pin 26 defines a tapered portion 112 and a first collar 114 with a shoulder 116 disposed therebetween. Accordingly, the locking fingers 110 engage the shoulder 116 to secure the negative lead gas carrying pin 26 within the plug housing 20 as the negative lead gas carrying pin 26 is inserted into the plug housing 20 in the direction of arrow C such that the connection therebetween is tamper resistant.

As shown, the locking fingers 110 slope inwardly and distally, and the shoulder 116 faces proximally when disposed within the hollow internal channel 38. Accordingly, the shoulder 116 engages distal ends of the locking fingers 110 such that the negative lead gas carrying pin 26 is retained within the plug housing 20 against proximal movement. As further shown, the hollow internal channel 38 and the negative lead gas carrying pin 26 extend distally beyond the engagement between the locking fingers 110 and the negative lead gas carrying pin 26, to define a relatively long, restricted space between the negative lead gas carrying pin 26 and the hollow internal channel 38 that restricts access to the locking fingers 110.

As further shown in FIG. 21, the hollow internal channel 38 also comprises a first portion 38a and a second portion 38b, which are separated by the locking fingers 110 as shown. Accordingly, the negative lead gas carrying pin 26 is disposed within the first portion 38a and the second portion 38b when fully engaged within the plug housing 20. Further, the negative lead gas carrying pin 26 also defines a second collar 118 disposed at a base end 120 of the tapered portion 112. Accordingly, the second collar 118 blocks access to the locking fingers 110 by engaging the first portion 38a of the hollow internal channel 38 along an interface 122 such that the locking fingers 110 cannot be accessed to disengage the negative lead gas carrying pin 26. When fully engaged, therefore, the first collar 114 is disposed within the second portion 38b of the hollow internal channel 38, and the second collar 118 is disposed within the first portion 38a of the hollow internal channel 38 engaging the interface 122. Moreover, the negative lead gas carrying pin 26 is recessed within the second portion 38b of the hollow internal channel 38 at a proximal end 39 of the plug housing 20 to further limit and maintain a tamper resistant pin connection.

To install the negative lead gas carrying pin 26 within the plug housing 20, the negative lead gas carrying pin 26 is first inserted through the first portion 38a of the hollow internal channel 38 until the locking fingers 110 engage the negative lead gas carrying pin 26. As the negative lead gas carrying pin 26 is further inserted into the plug housing 20 in the direction of arrow C, the locking fingers 110 expand radially outward as the first collar 114 engages the locking fingers 110. After the first collar 114 passes beyond the locking fingers 110, the locking fingers 110 flex back radially inward to engage the shoulder 116. As a result, the negative lead gas carrying pin 26 is secured within the socket housing 22 such that a tamper resistant pin connection is provided. Accordingly, if the negative lead gas carrying pin 26 is pulled in a direction opposite to that of arrow C, the shoulder 116 abuts the locking fingers 110, and thus the negative lead gas carrying pin 26 is prevented from movement in such direction.

Referring now to FIG. 22, a total of eight (8) locking fingers 110 are employed in one preferred form of the present invention. As shown, the locking fingers 110 are preferably evenly spaced around the hollow internal channel 38. Further, the locking fingers 110 are preferably integrally formed within the hollow internal channel 38 such that the plug housing 20 are a single, unitized component. The preferred material for the plug housing 20 is a fiber-reinforced nylon such as Nylon 66, which is non-conductive, lightweight, flexible, and durable. However, other materials commonly known in the art may also be employed in accordance with the teachings of the present invention.

Accordingly, a tamper resistant pin connection is provided by the teachings of the present invention, wherein a pin is secured within a housing such that an improper pin may not readily be replaced in the field. As a result, unauthorized modification of the plasma arc torch and consequent degradation of torch operations in inhibited.

O-Ring Removal Slot

Figure 23:
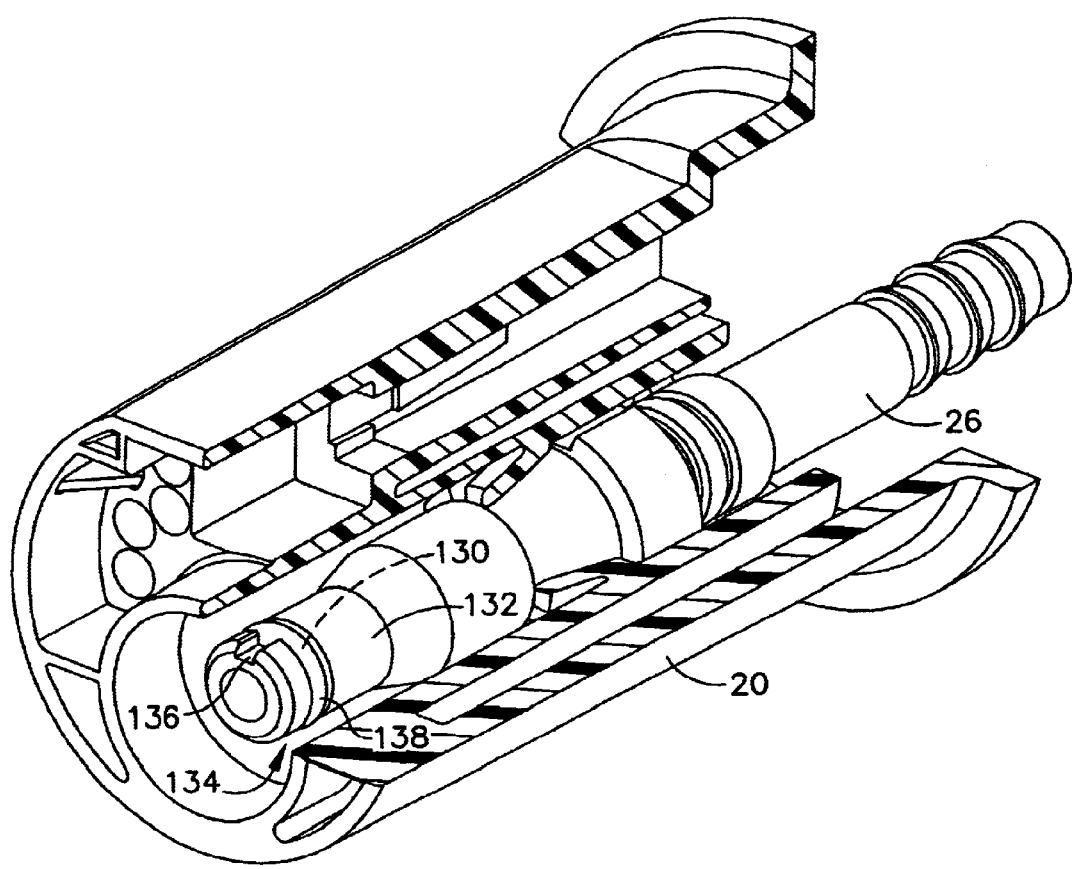
FIG. 23 is a cutaway perspective view of an embodiment of an o-ring removal slot of a negative lead gas carrying pin constructed in accordance with the principles of the present invention.
Figure 24:
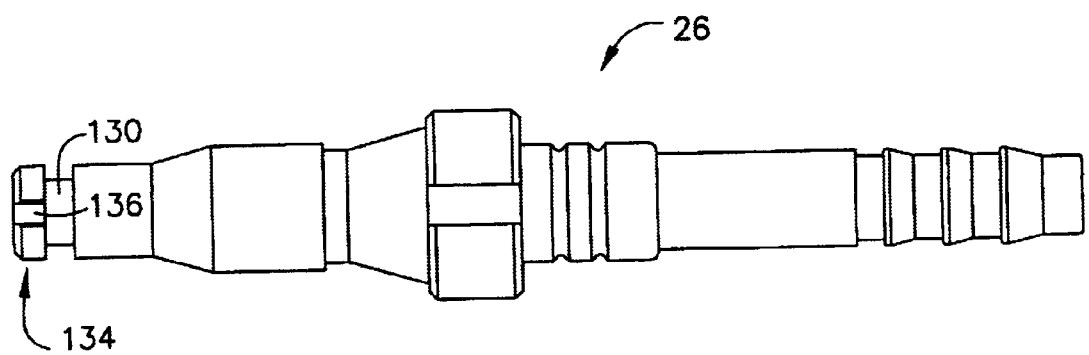
FIG. 24 is a top view of an embodiment of an o-ring removal slot of a negative lead gas carrying pin constructed in accordance with the principles of the present invention.

Referring to the FIGS. 23 and 24, the negative lead gas carrying pin 26 that is preferably recessed within the plug housing 20 further comprises an o-ring groove 130 disposed around a cylindrical portion 132 thereof. Further, the cylindrical portion 132 is disposed at a distal end 134 of the negative lead gas carrying pin 26, which is recessed inside the quick disconnect 10 in accordance with one form of the present invention. As further shown, the negative lead gas carrying pin 26 also comprises an o-ring removal slot 136 adjoining the o-ring groove 130, which provides access for removal of an o-ring 138 disposed within the o-ring groove 130, using, for example, an o-ring removal tool (not shown).

Generally, the negative lead gas carrying pin 26 engages the main power socket 28 (not shown), and the o-ring 138 provides a fluid-tight seal between the negative lead gas carrying pin 26 and the main power socket 28 when the quick disconnect 10 is fully engaged. Referring specifically to FIG. 24, wherein the o-ring 138 is not shown for clarity, the o-ring removal slot 136 in one form is approximately perpendicular to the o-ring groove 130 as illustrated, although other orientations may also be employed in accordance with the teachings of the present invention. Further, the o-ring removal slot 136 extends between the distal end 134 of the negative lead gas carrying pin 26 and the o-ring groove 130, such that an o-ring removal tool (not shown) may be inserted into the plug housing 20 proximate the recessed negative lead gas carrying pin 26 to engage the o-ring removal slot 136 and thus remove the o-ring 138 disposed within the o-ring groove 130.

The o-ring removal slot 136 may extend from the distal end 134 of the negative lead gas carrying pin 26 as shown, or alternately, the o-ring removal slot 136 may extend to adjoin the o-ring groove 130 from an intermediate location along the negative lead gas carrying pin 26. The depth of the o-ring removal slot 136 is preferably approximately the same depth as the o-ring groove 130, however, a shallower depth may also be employed in accordance with the teachings of the present invention. Furthermore, the o-ring removal slot 136 may have a non-constant constant depth along its length from the distal end 134 of the negative lead gas carrying pin 26, or an intermediate location along the negative lead gas carrying pin 26, to the o-ring groove 130. For example, the o-ring removal slot 136 may be deeper towards the o-ring groove 130 than at the distal end 134 of the negative lead gas carrying pin 26.

Additionally, the o-ring removal slot 136 is sized appropriately such that the sealing function of the o-ring 138 is not adversely affected. For example, in one form of the present invention, the o-ring removal slot 136 is approximately 0.0625 in. (0.1588 mm) wide, approximately 0.031 in. (0.080 mm) deep, and approximately 0.094 in. (0.238 mm) long with an o-ring groove 130 diameter of approximately 0.20 in. (0.52 mm). Accordingly, the sealing integrity of the o-ring 138 is not adversely affected with the presence of the o-ring removal slot 136.

Figure 25:
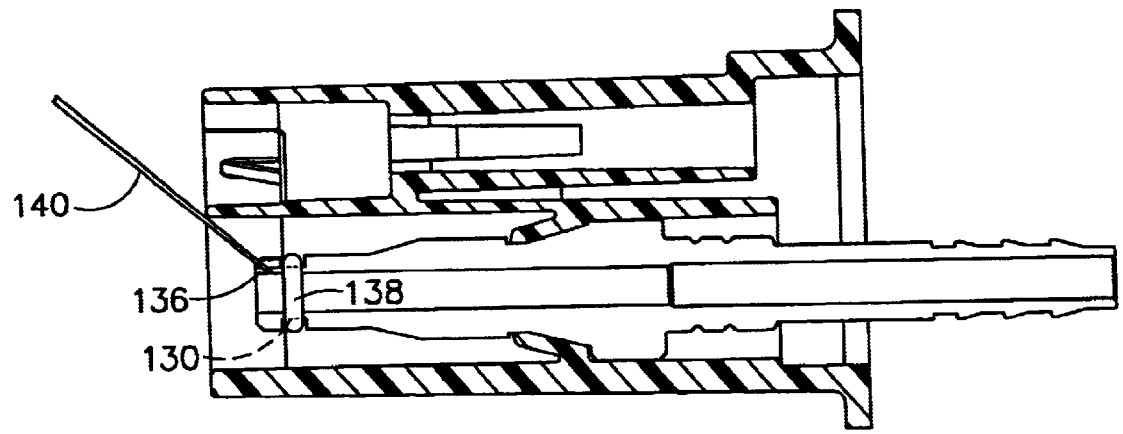
FIG. 25 is a side view of an embodiment of an o-ring removal tool removing an o-ring from a negative lead gas carrying pin in accordance with the principles of the present invention.

As shown in FIG. 25, an o-ring removal tool 140 engages the o-ring removal slot 136 and then engages the o-ring 138 disposed within the o-ring groove 130 to remove the o-ring 138 for inspection and/or replacement. Accordingly, the o-ring 138 is removed more easily since greater access thereto is gained through the o-ring removal slot 136, especially if the o-ring groove 130 is recessed within the quick disconnect 10 as previously described. As a result, the o-ring 138 may be removed relatively quickly while minimizing any damage to both the o-ring 138 as well as the negative lead gas carrying pin 26 from engagement of the o-ring removal tool 140. Additionally, a plurality of o-ring removal slots 136 may be disposed within the negative lead gas carrying pin 26 rather than only one o-ring removal slot 136 as described herein, such that at least one o-ring removal tool 140 engages a plurality of o-ring removal slots to remove the o-ring 138.

In another form of the present invention, the o-ring removal slot 136 is employed in a sealing member (not shown) rather than the negative lead gas carrying pin 26 as described above. The sealing member may be any number of components in a variety of systems such as fluid applications, e.g., fuel lines and connectors, or pneumatic applications, e.g. compressed air lines and connectors, among others. The sealing member similarly comprises an o-ring groove and an o-ring removal slot adjoining the o-ring groove. Accordingly, the o-ring removal slot provides access for removal of the o-ring disposed within the o-ring groove as previously described. Additionally, the o-ring groove may be disposed around an outer surface (e.g., outer diameter) of the sealing member or around an inner surface (e.g., inner diameter) of the sealing member according to the configuration of the sealing member. Moreover, a plurality of o-ring removal slots may be employed rather than a single o-ring removal slot.

Figure 26:
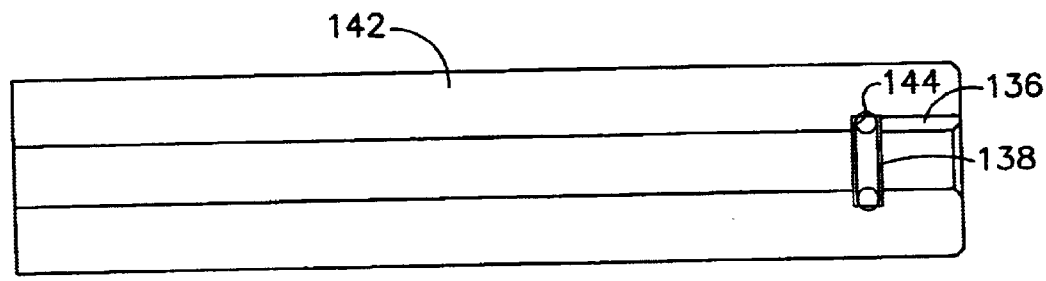
FIG. 26 is a cross-sectional view of an embodiment of an o-ring removal slot of a sealing member having an o-ring shoulder constructed in accordance with the principles of the present invention.

Referring now to FIG. 26, the o-ring removal slot 136 is employed in a sealing member 142 in yet another form of the present invention, wherein the o-ring removal slot 136 adjoins a shoulder 144 rather than an o-ring groove 130 as previously described. As shown, the o-ring 138 is disposed against the shoulder 144 to seal an interface between the sealing member 142 and an adjacent sealing member (not shown). Accordingly, the o-ring removal slot 136 provides access for removal of the o-ring 138. Additionally, the o-ring removal slot 136 is approximately perpendicular to the o-ring shoulder 144, although other orientations such as a spiral that adjoins the shoulder 144 at an angle may be employed in accordance with the teachings of the present invention. Furthermore, the o-ring removal slot 136 may have a constant or non-constant depth, which is sized according to the specific application so as to maintain the sealing integrity of the o-ring 138.

In one form, the sealing member 142 may be a main power socket as previously described with the shoulder 144 disposed therein. Accordingly, the o-ring 138 provides a fluid-tight seal between the main power socket 28 and the negative lead gas carrying pin 26. Similarly, a plurality of o-ring removal slots 136 may be employed rather than a single o-ring removal slot 136 as described herein.

Accordingly, a pin and sealing member are disclosed that provide improved access for removal of o-rings disposed therein, along with associated methods for removal of the o-rings. As a result, o-rings can be removed more easily while reducing the risk of damage to both the o-ring and the pin or sealing member from the use of o-ring removal tools.

Make-Break Timing Sequence

Referring now to FIG. 27*a*, a fully engaged quick disconnect 10 is illustrated, wherein a plurality of fluid and electrical connections are disposed within the quick disconnect 10. More specifically, at least one signal connection 150 is disposed within the quick disconnect 10, which generally comprises the signal pin 30 secured within the plug housing 20 and engaged within a signal socket 32 that is secured within the socket housing 22. Further, a pilot return connection 152 is disposed within the quick disconnect 10, wherein the pilot return pin 34 secured within the plug housing 20 is engaged within the pilot return socket 36 secured within the socket housing 22. Additionally, a fluid connection 154 and a main power connection 156 are disposed within the quick disconnect 10, in which the negative lead gas carrying pin 26 secured within the plug housing 20 is engaged within the main power socket 28 secured within the socket housing 22.

As shown in FIG. 27*b*, the signal connection 150 defines a length A, the pilot return connection 152 defines a length B, the fluid connection 154 defines a length C, and the main power connection 156 defines a length D. Generally, the lengths are defined as the overall length of the connection when the quick disconnect is in a fully engaged position to when the respective connection is broken as the quick disconnect 10 is disengaged. Accordingly, the length A of signal connection 150 is defined by the extension of the signal pin 30 into the signal socket 32. Further, length A is shorter than the length B of the pilot return connection 152, the length C of the fluid connection 154, and the length D of the main power connection 156. Referring now to the pilot return connection 152, length B is defined by the extension of the pilot return pin 34 into the pilot return socket 36. Accordingly, the pilot return connection 152 is shorter than the length C of the fluid connection 154 and the length D of the main power connection 156. At the fluid connection 154, the length C is defined by the extension of an o-ring 157 within the main power socket 28, and as shown, the length C is shorter than length D of the main power connection 156. Finally, at the main power connection 156, the length D is defined by the extension of the negative lead gas carrying pin 26 within the main power socket 28, and more specifically the extension of a collar 159 within the main power socket 28, such that the length D of the main power connection 156 is longer than the other connections within the quick disconnect 10.

In one preferred form, length A of the signal connection 18 is approximately 0.21 in. (0.53 mm), the length B of the pilot return connection 24 is approximately 0.22 in. (0.56 mm), the length C of the fluid connection 30 is approximately 0.25 in. (0.64 mm), and the length D of the main power connection 32 is approximately 0.33 in. (0.84 mm).

As a result of the configuration of each connection and their respective connection lengths, the order in which the connections are broken when the quick disconnect 10 is disengaged is controlled in accordance with the present invention. More specifically, the signal connection 150 breaks before the pilot return connection 152, the fluid connection 154, and the main power connection 156. Further, the pilot return connection 152 breaks before the fluid connection 154 and the main power connection 156, and the fluid connection 154 breaks before the main power connection 156. Finally, the main power connection 156 breaks after the signal connection 150, the pilot return connection 152, and the fluid connection 154, which results in improved operation of a plasma arc torch when the quick disconnect 10 is disengaged as described in greater detail below.

Referring now to FIG. 28, when the quick disconnect 10 is initially disengaged, the signal connection 150 breaks before the pilot return connection 152, the fluid connection 154, and the main power connection 156 as shown. Accordingly, the power supply (not shown) experiences an action similar to letting go of a torch switch (not shown) when the quick disconnect is disengaged. If the quick disconnect 10 is disengaged while the plasma arc torch is in operation, the signal connection 150 would break first, causing the power supply to stop outputting power through the main power connection 156 and the pilot return connection 152. Furthermore, a plurality of signal connections 150 may be disposed within the quick disconnect 10, and in one preferred form, a total of eight (8) signal connections 150 are employed within the quick disconnect 10. Moreover, the signal connection 150 may also be sequenced to break in a specific order, for example, breaking the trigger switch signal before the parts-in-place signal, among other possible variations specific to the different signal connections within the quick disconnect 10.

As the quick disconnect 10 is further disengaged as shown in FIG. 29, the pilot return connection 152 breaks after the signal connection 150 and before the fluid connection 154 and the main power connection 156. Accordingly, the pilot return connection 152 is broken before the fluid connection 154 such that there does not exist a possibility of trying to pilot the plasma arc torch without gas flow. Generally, the presence of gas flow provides an audible indication to the user that power is present at the torch and that the torch may pilot at any time. With the pilot return connection 152 breaking second before the fluid connection 154, an additional safety feature is thereby provided to the user.

Referring now to FIG. 30, as the quick disconnect 10 is further disengaged, the fluid connection 154 breaks after the signal connection 150 and the pilot return connection 152 as the o-ring 157 separates from the main power socket 28 Since the fluid connection 154 breaks after the signal connection 150 and the pilot return connection 152, gas cannot leak out of the quick disconnect 10 when the quick disconnect 10 is not fully engaged. Since the fluid connection 154 is timed to break after the signal connection 150 and the pilot return connection 152, the plasma arc torch would not function, and would further not leak gas, if the quick disconnect 10 were not fully engaged.

As shown in FIG. 31, the main power connection 156 breaks after the signal connection 150, the pilot return connection 152, and the fluid connection 154, as the collar 159 separates from the main power socket 28. Further, the main power connection 156 is a relatively high current conducting member within the quick disconnect 10. Accordingly, since the main power connection 156 breaks last, the possibility of drawing an arc is minimized if the quick disconnect 10 is inadvertently disengaged during operation of the plasma arc torch.

Figure 32:
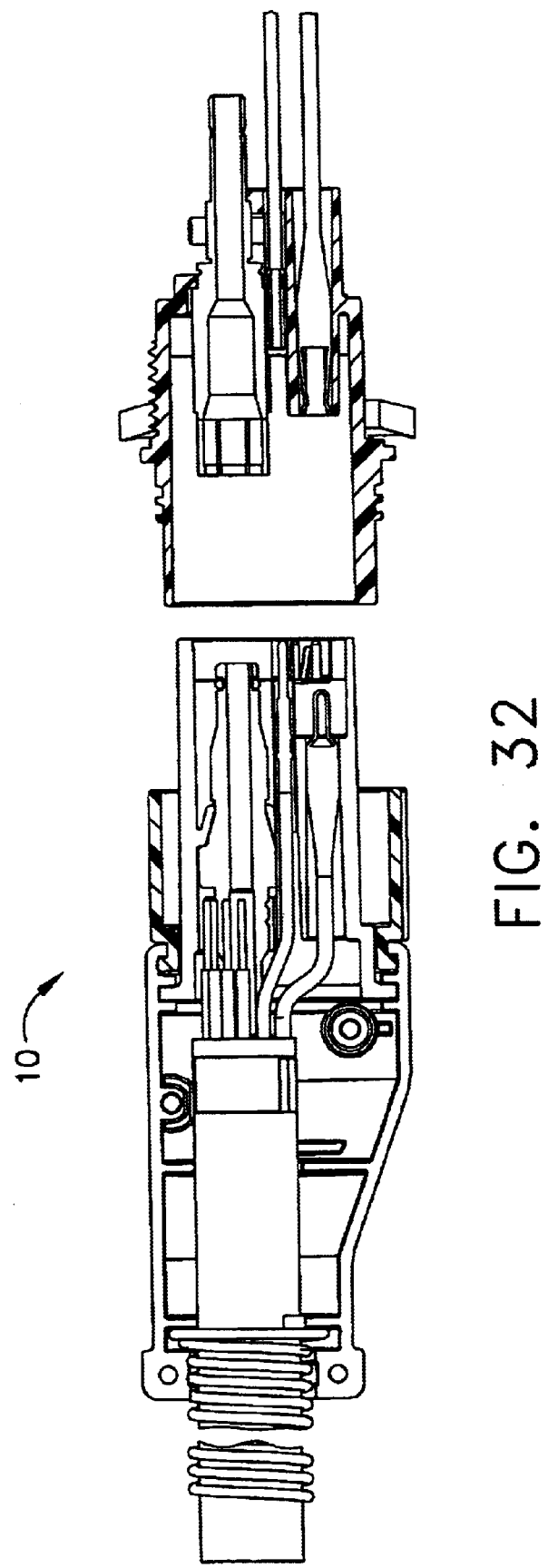
FIG. 32 is a cross-sectional view of a quick disconnect fully disengaged in accordance with the present invention.

Referring now to FIG. 32 the quick disconnect 10 is illustrated in the fully disengaged position, wherein all of the connections are broken. Accordingly, a quick disconnect 10 is provided wherein the connections break in a specific order when the quick disconnect is disengaged, thereby resulting in a safer operation of a plasma arc apparatus.

In addition to the sequence of breaking connections as previously described, the signal connections 150 may also be sequenced to break in a specific order rather than breaking at the same time as described herein. For example, the signal connections 150 for a trigger switch may break first, followed by breaking the signal connections 150 for a parts-in-place switch. Accordingly, the length for the trigger switch signal connection would be shorter than the length for the parts-in-place switch signal connection. As a result, a variety of lengths of the signal connections 150 may also be employed to sequence disconnection of various signals within the plasma arc torch.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A quick disconnect for use in a plasma arc apparatus comprising:
    a socket housing secured to a power supply;
    a main power socket secured within the socket housing;
    a plug housing secured to a torch lead;
    a negative lead gas carrying pin secured within the plug housing;
    a locking ring disposed around the plug housing;
    a plurality of signal pins secured within the plug housing;
    a plurality of signal sockets secured within the socket housing;
    a pilot return pin secured within the plug housing; and
    a pilot return socket secured within the socket housing,
    wherein the signal pins engage the signal sockets, the pilot return pin engages the pilot return socket, the negative lead gas carrying pin engages the main power socket, and the locking ring engages the socket housing to secure the plug housing to the socket housing, while the negative lead gas carrying pin and the main power socket are positioned off-center to provide additional volume for the signal pins and the pilot return pin.

2. The quick disconnect of claim 1, wherein the negative lead gas carrying pin is recessed within the plug housing.

3. The quick disconnect of claim 1, wherein the main power socket is recessed within the socket housing.

4. The quick disconnect of claim 1, wherein the signal pins are recessed with the plug housing.

5. The quick disconnect of claim 1, wherein the signal sockets are recessed within the socket housing.

6. The quick disconnect of claim 1, wherein the pilot return pin is recessed within the plug housing.

7. The quick disconnect of claim 1, wherein the pilot return socket is recessed within the socket housing.

8. The quick disconnect of claim 1, wherein the plug housing and the socket housing define D-configurations to properly align the plug housing to the socket housing.

9. The quick disconnect of claim 1 further comprising:
    a plurality of signal conductors secured to a distal end of the socket housing;
    a pilot return conductor secured to the distal end of the socket housing; and
    a signal pin shroud protruding from the distal end of the socket housing and disposed between the plurality of signal conductors, the pilot return conductor, and the main power socket to provide a dielectric barrier therebetween.

10. The quick disconnect of claim 1, wherein the main power socket further comprises:
   a plurality of fingers that engage the negative lead gas carrying pin, the fingers being separated by axial slots defining a length; and
   a plurality of radial contact pads disposed at a proximal end of the main power socket,
   wherein an undercut reduces the required length of the axial slots to engage the negative lead gas carrying pin.

11. The quick disconnect of claim 1, wherein the plug housing and the socket housing comprise a fiber-reinforced nylon material.

12. A connector comprising:
   a socket housing defining a D-configuration;
   a plug housing defining a D-configuration;
   a plurality of electrical conductors secured within the socket housing and the plug housing;
   a plurality of gas conductors secured within the socket housing and the plug housing,
   wherein the plurality of electrical conductors in the plug housing engage the plurality of electrical conductors in the socket housing, at least one gas conductor disposed within the plug housing engages at least one gas conductor disposed within the socket housing, the plug housing engages the socket housing, and the D-configurations align the plug housing to the socket housing for engagement thereof.

13. The connector of claim 12 further comprising a locking ring disposed around the plug housing, wherein the locking ring engages the socket housing to secure the plug housing to the socket housing.

14. The connector of claim 12, wherein the plurality of electrical conductors in the plug housing are recessed within the plug housing.

15. The connector of claim 12, wherein the plurality of electrical conductors in the socket housing are recessed within the socket housing.

16. The connector of claim 12, wherein at least one gas conductor in the plug housing is recessed within the plug housing.

17. The connector of claim 12, wherein at least one gas conductor in the socket housing is recessed within the socket housing.

18. The connector of claim 12 further comprising:
   a signal pin shroud protruding from a distal end of the socket housing and disposed between the plurality of electrical conductors and gas conductors to provide a dielectric barrier therebetween.

19. A quick disconnect for use in a plasma arc apparatus comprising:
   a socket housing secured to a power supply and defining a D-configuration;
   a main power socket recessed within the socket housing and positioned off-center;
   a plug housing secured to a torch lead and defining a D-configuration;
   a negative lead gas carrying pin recessed within the plug housing and positioned off-center;
   a locking ring disposed around the plug housing;
   a plurality of signal pins recessed within the plug housing;
   a plurality of signal sockets recessed within the socket housing;
   a pilot return pin recessed within the plug housing; and
   a pilot return socket recessed within the socket housing,
   wherein the signal pins engage the signal sockets, the pilot return pin engages the pilot return socket, the negative lead gas carrying pin engages the main power socket, and the locking ring engages the socket housing to secure the plug housing to the socket housing, while the D-configurations align the plug housing with the socket housing for engagement thereof.

20. The quick disconnect of claim 19 further comprising:
   a plurality of signal conductors secured to a distal end of the socket housing;
   a pilot return conductor secured to the distal end of the socket housing; and
   a signal pin shroud protruding from the distal end of the socket housing and disposed between the plurality of signal conductors, the pilot return conductor, and the main power socket to provide a dielectric barrier therebetween.

21. The quick disconnect of claim 19, wherein the main power socket further comprises:
   a plurality of fingers that engage the negative lead gas carrying pin, the fingers being separated by axial slots defining a length; and
   a plurality of radial contact pads disposed at a proximal end of the main power socket,
   wherein an undercut reduces the required length of the axial slots to engage the negative lead gas carrying pin.

22. The quick disconnect of claim 19, wherein the plug housing and the socket housing comprise a fiber-reinforced nylon material.

23. A quick disconnect for use in a plasma arc apparatus comprising:
   a socket housing secured to a power supply and defining a D-configuration;
   a plurality of main power sockets recessed within the socket housing;
   a plug housing secured to a torch lead and defining a D-configuration;
   a plurality of negative lead gas carrying pins recessed within the plug housing;
   a locking ring disposed around the plug housing;
   a plurality of signal pins recessed within the plug housing;
   a plurality of signal sockets recessed within the socket housing;
   a pilot return pin recessed within the plug housing; and
   a pilot return socket recessed within the socket housing,
   wherein the signal pins engage the signal sockets, the pilot return pin engages the pilot return socket, the negative lead gas carrying pins engage the main power sockets, and the locking ring engages the socket housing to secure the plug housing to the socket housing, while the D-configurations align the plug housing with the socket housing for engagement thereof.

24. The quick disconnect of claim 23 further comprising:
   a plurality of signal conductors secured to a distal end of the socket housing;
   a pilot return conductor secured to the distal end of the socket housing; and
   a signal pin shroud protruding from the distal end of the socket housing and disposed between the plurality of signal conductors, the pilot return conductor, and the plurality of main power sockets to provide a dielectric barrier therebetween.

25. The quick disconnect of claim 23, wherein the main power sockets further comprise:
   a plurality of fingers that engage the negative lead gas carrying pins, the fingers being separated by axial slots defining a length; and
   a plurality of radial contact pads disposed at a proximal end of the main power socket,
   wherein an undercut reduces the required length of the axial slots to engage the negative lead gas carrying pins.

26. The quick disconnect of claim 23, wherein the plug housing and the socket housing comprise a fiber-reinforced nylon material.

27. A quick disconnect for use in a plasma arc apparatus comprising:
   a socket housing secured to a power supply;
   a main power socket secured within the socket housing, the main power socket comprising a plurality of fingers being separated by axial slots defining a length and a plurality of radial contact pads disposed at a proximal end of the main power socket;
   a plug housing secured to a torch lead;
   a negative lead gas carrying pin secured within the plug housing and engaged by the plurality of radial contact pads;
   a locking ring disposed around the plug housing;
   a plurality of signal pins secured within the plug housing;
   a plurality of signal sockets secured within the socket housing;
   a pilot return pin secured within the plug housing; and
   a pilot return socket secured within the socket housing,
   wherein the signal pins engage the signal sockets, the pilot return pin engages the pilot return socket, the negative lead gas carrying pin engages the main power socket, the locking ring engages the socket housing to secure the plug housing to the socket housing, and an undercut reduces the required length of the axial slots to engage the negative lead gas carrying pin.

28. The quick disconnect of claim 27, wherein the plug housing and the socket housing define D-configurations to properly align the plug housing to the socket housing.

29. The quick disconnect of claim 27 further comprising:
   a plurality of signal conductors secured to a distal end of the socket housing;
   a pilot return conductor secured to the distal end of the socket housing; and
   a signal pin shroud protruding from the distal end of the socket housing and disposed between the plurality of signal conductors, the pilot return conductor, and the main power socket to provide a dielectric barrier therebetween.

30. A quick disconnect for use in a plasma arc apparatus comprising:
   a socket housing secured to a power supply;
   a plurality of signal conductors secured to a distal end of the socket housing;
   a pilot return conductor secured to the distal end of the socket housing;
   a signal pin shroud protruding from the distal end of the socket housing and disposed between the plurality of signal conductors, the pilot return conductor, and the main power socket to provide a dielectric barrier therebetween;
   a main power socket secured within the socket housing;
   a plug housing secured to a torch lead;
   a negative lead gas carrying pin secured within the plug housing;
   a locking ring disposed around the plug housing;
   a plurality of signal pins secured within the plug housing;
   a plurality of signal sockets secured within the socket housing;
   a pilot return pin secured within the plug housing; and
   a pilot return socket secured within the socket housing,
   wherein the signal pins engage the signal sockets, the pilot return pin engages the pilot return socket, the negative lead gas carrying pin engages the main power socket, and the locking ring engages the socket housing to secure the plug housing to the socket housing.

31. The quick disconnect of claim 30, wherein the plug housing and the socket housing define D-configurations to properly align the plug housing to the socket housing.

32. The quick disconnect of claim 30, wherein the main power socket further comprises
   a plurality of fingers that engage the negative lead gas carrying pins, the fingers being separated by axial slots defining a length; and
   a plurality of radial contact pads disposed at a proximal end of the main power socket,
   wherein an undercut reduces the required length of the axial slots to engage the negative lead gas carrying pins.

33. A plug housing for use in a quick disconnect for a plasma arc apparatus comprising:
   a hollow internal channel positioned off-center the plug housing,
   wherein the plug housing defines a D-configuration to align the plug housing with a mating socket housing.

34. The plug housing of claim 33 further comprising a plurality of signal pin channels.

35. The plug housing of claim 33 further comprising a pilot return channel.

36. A plug housing for use in a quick disconnect for a plasma arc apparatus comprising a hollow internal channel positioned off-center the plug housing to provide additional volume for fluid and electric conductors.

37. A plug housing for use in a quick disconnect for a plasma arc apparatus, wherein the plug housing defines a D-configuration to align the plug housing with a mating socket housing.

38. A socket housing for use in a quick disconnect for a plasma arc apparatus comprising:
   a main power socket aperture positioned off-center the socket housing,
   wherein the socket housing defines a D-configuration to align the socket housing with a mating plug housing.

39. The socket housing of claim 38 further comprising a plurality of signal pin apertures.

40. The socket housing of claim 38 further comprising a pilot return aperture.

41. A socket housing for use in a quick disconnect for a plasma arc apparatus comprising a main power socket aperture positioned off-center the socket housing to provide additional volume for fluid and electric conductors.

42. A socket housing for use in a quick disconnect for a plasma arc apparatus, wherein the socket housing defines a D-configuration to align the socket housing with a mating plug housing.

43. A connector comprising:

a socket housing;

a plug housing;

a locking ring disposed around the plug housing;

a main pin conducting both electricity and fluid secured within the plug housing;

a main power socket conducting both electricity and fluid secured within the socket housing; and a plurality of signal conductors, wherein the main pin engages the main power socket, the plug housing engages the socket housing, and the locking ring engages the socket housing to secure the plug housing to the socket housing, while the main pin and the main power socket are positioned off-center to provide additional volume for the signal conductors.

44. The connector of claim 43, wherein the plug housing and the socket housing define D-configurations to properly align the plug housing to the socket housing.

* * * * *